United States Patent
Vaidya et al.

(10) Patent No.: US 11,903,049 B2
(45) Date of Patent: Feb. 13, 2024

(54) APPARATUS AND METHODS FOR CELL IDENTIFICATION IN WIRELESS NETWORKS

(71) Applicant: Charter Communications Operating, LLC, St. Louis, MO (US)

(72) Inventors: Maulik Vaidya, Escondido, CA (US); Amitav Mukherjee, Elk Grove, CA (US)

(73) Assignee: CHARTER COMMUNICATIONS OPERATING, LLC, St. Louis, MO (US)

(*) Notice: Subject to any disclaimer, the term of this patent is extended or adjusted under 35 U.S.C. 154(b) by 51 days.

(21) Appl. No.: 17/479,989

(22) Filed: Sep. 20, 2021

(65) Prior Publication Data

US 2022/0007440 A1 Jan. 6, 2022

Related U.S. Application Data

(63) Continuation of application No. 16/601,345, filed on Oct. 14, 2019, now Pat. No. 11,129,213.
(Continued)

(51) Int. Cl.
*H04W 76/11* (2018.01)
*H04W 24/10* (2009.01)
(Continued)

(52) U.S. Cl.
CPC .............. *H04W 76/11* (2018.02); *H04W 8/08* (2013.01); *H04W 8/265* (2013.01); *H04W 24/10* (2013.01);
(Continued)

(58) Field of Classification Search
CPC ....... H04W 76/11; H04W 24/10; H04W 8/08; H04W 48/16; H04W 76/27; H04W 8/26;
(Continued)

(56) References Cited

U.S. PATENT DOCUMENTS 3,999,051 A  12/1976  Petschauer
4,339,657 A   7/1982  Larson et al.
(Continued)

FOREIGN PATENT DOCUMENTS

CN     105071860 A    11/2015
EP       0812119 A2    12/1997
(Continued)

OTHER PUBLICATIONS

Methods and Arrangements for Proximity Detection; WO 2013051988 A1 (Year: 2013).*
(Continued)

*Primary Examiner* — Meless N Zewdu
(74) *Attorney, Agent, or Firm* — Patent Beach PC

(57) ABSTRACT

Apparatus and methods for physical cell identification within one or more wireless networks. In one embodiment, conflicts in PCI values which may exist within two or more mobile networks (e.g., PLMNs) of respective different operators when unlicensed spectrum is utilized (e.g., according to 3GPP 5G NR-U technology) are resolved. In one implementation, this functionality is provided by specifying one or more mobility-related parameters associated with various UE, such that serving gNBs can determine whether a given UE requires a mobility context, and as such whether it should conduct subsequent RF measurement reporting to report back potential conflicts in PCI it may encounter to the gNB. In one variant, the measurement reporting is configured to comply with 5G NR-U required "listen-before-talk" or LBT protocols; i.e., to measure parameters consistent with the LBT protocols to detect any such PCI-based conflicts.

20 Claims, 17 Drawing Sheets

Related U.S. Application Data

(60) Provisional application No. 62/745,065, filed on Oct. 12, 2018, provisional application No. 62/752,002, filed on Oct. 29, 2018.

(51) Int. Cl.
| | |
|---|---|
| *H04W 8/08* | (2009.01) |
| *H04W 48/16* | (2009.01) |
| *H04W 76/27* | (2018.01) |
| *H04W 8/26* | (2009.01) |
| *H04W 84/04* | (2009.01) |

(52) U.S. Cl.
CPC ............ *H04W 48/16* (2013.01); *H04W 76/27* (2018.02); *H04W 84/042* (2013.01)

(58) Field of Classification Search
CPC ......... H04W 4/00; H04W 4/02; H04W 4/021; H04W 4/0429; H04W 4/025; H04W 4/026; H04W 4/027; H04W 4/16; H04W 4/18; H04W 4/185; H04W 4/30; H04W 4/33; H04W 4/38; H04W 4/50; H04W 4/60; H04W 4/70; H04W 4/80; H04W 84/06; H04W 84/18; H04W 88/00; H04W 88/02; H04W 88/08; H04W 88/18; G06F 16/387; G06F 16/487; G06F 16/587; H04N 21/422

See application file for complete search history.

(56) References Cited

U.S. PATENT DOCUMENTS

| | | | |
|---|---|---|---|
| 4,574,364 | A | 3/1986 | Tabata et al. |
| 4,604,751 | A | 8/1986 | Aichelmann, Jr. et al. |
| 4,692,757 | A | 9/1987 | Tsuhara et al. |
| 4,710,761 | A | 12/1987 | Kapur et al. |
| 4,845,644 | A | 7/1989 | Anthias et al. |
| 4,890,098 | A | 12/1989 | Dawes et al. |
| 4,890,257 | A | 12/1989 | Anthias et al. |
| 5,113,517 | A | 5/1992 | Beard et al. |
| 5,121,475 | A | 6/1992 | Child et al. |
| 5,129,055 | A | 7/1992 | Yamazaki et al. |
| 5,155,731 | A | 10/1992 | Yamaguchi |
| 5,175,813 | A | 12/1992 | Golding et al. |
| 5,245,615 | A | 9/1993 | Treu |
| 5,276,437 | A | 1/1994 | Horvath et al. |
| 5,408,602 | A | 4/1995 | Giokas et al. |
| 5,463,768 | A | 10/1995 | Cuddihy et al. |
| 5,487,143 | A | 1/1996 | Southgate |
| 5,502,839 | A | 3/1996 | Kolnick |
| 5,522,025 | A | 5/1996 | Rosenstein |
| 5,564,002 | A | 10/1996 | Brown |
| 5,581,686 | A | 12/1996 | Koppolu et al. |
| 5,596,702 | A | 1/1997 | Stucka et al. |
| 5,621,879 | A | 4/1997 | Kohda |
| 5,664,046 | A | 9/1997 | Abecassis |
| 5,673,403 | A | 9/1997 | Brown et al. |
| 5,675,755 | A | 10/1997 | Trueblood |
| 5,692,142 | A | 11/1997 | Craycroft et al. |
| 5,734,380 | A | 3/1998 | Adams et al. |
| 5,742,583 | A | 4/1998 | Scott |
| 5,764,230 | A | 6/1998 | Baradel et al. |
| 5,790,779 | A | 8/1998 | Ben-Natan et al. |
| 5,831,609 | A | 11/1998 | London et al. |
| 5,850,544 | A | 12/1998 | Parvathaneny et al. |
| 5,856,826 | A | 1/1999 | Craycroft |
| 5,862,316 | A | 1/1999 | Hagersten et al. |
| 5,867,160 | A | 2/1999 | Kraft, IV et al. |
| 5,874,960 | A | 2/1999 | Mairs et al. |
| 5,877,755 | A | 3/1999 | Hellhake |
| 5,895,472 | A | 4/1999 | Brodsky et al. |
| 5,973,702 | A | 10/1999 | Orton et al. |
| 5,995,103 | A | 11/1999 | Ashe |
| 6,031,530 | A | 2/2000 | Trueblood |
| 6,092,107 | A | 7/2000 | Eleftheriadis et al. |
| 6,160,872 | A | 12/2000 | Karnowski et al. |
| 6,169,725 | B1 | 1/2001 | Gibbs et al. |
| 6,181,713 | B1 | 1/2001 | Patki et al. |
| 6,192,403 | B1 | 2/2001 | Jong et al. |
| 6,216,152 | B1 | 4/2001 | Wong et al. |
| 6,219,044 | B1 | 4/2001 | Ansberry et al. |
| 6,233,611 | B1 | 5/2001 | Ludtke et al. |
| 6,240,555 | B1 | 5/2001 | Shoff et al. |
| 6,252,889 | B1 | 6/2001 | Patki et al. |
| 6,313,880 | B1 | 11/2001 | Smyers et al. |
| 6,317,881 | B1 | 11/2001 | Shah-Nazaroff et al. |
| 6,330,010 | B1 | 12/2001 | Nason et al. |
| 6,336,122 | B1 | 1/2002 | Lee et al. |
| 6,337,717 | B1 | 1/2002 | Nason et al. |
| 6,366,876 | B1 | 4/2002 | Looney |
| 6,381,710 | B1 | 4/2002 | Kim |
| 6,381,735 | B1 | 4/2002 | Hunt |
| 6,397,262 | B1 | 5/2002 | Hayden et al. |
| 6,430,570 | B1 | 8/2002 | Judge et al. |
| 6,456,892 | B1 | 9/2002 | Dara-Abrams et al. |
| 6,460,141 | B1 | 10/2002 | Olden |
| 6,469,742 | B1 | 10/2002 | Trovato et al. |
| 6,496,864 | B1 | 12/2002 | Mccartney |
| 6,505,298 | B1 | 1/2003 | Cerbini et al. |
| 6,510,152 | B1 | 1/2003 | Gerszberg et al. |
| 6,529,965 | B1 | 3/2003 | Thomsen et al. |
| 6,532,552 | B1 | 3/2003 | Benignus et al. |
| 6,542,500 | B1 | 4/2003 | Gerszberg et al. |
| 6,542,739 | B1 | 4/2003 | Garner |
| 6,546,016 | B1 | 4/2003 | Gerszberg et al. |
| 6,546,419 | B1 | 4/2003 | Humpleman et al. |
| 6,600,958 | B1 | 7/2003 | Zondag |
| 6,606,711 | B2 | 8/2003 | Andrews et al. |
| 6,625,274 | B1 | 9/2003 | Hoffpauir et al. |
| 6,630,943 | B1 | 10/2003 | Nason et al. |
| 6,631,350 | B1 | 10/2003 | Celi, Jr. et al. |
| 6,631,403 | B1 | 10/2003 | Deutsch et al. |
| 6,651,248 | B1 | 11/2003 | Alpern |
| 6,654,722 | B1 | 11/2003 | Aldous et al. |
| 6,687,735 | B1 | 2/2004 | Logston et al. |
| 6,714,534 | B1 | 3/2004 | Gerszberg et al. |
| 6,750,879 | B2 | 6/2004 | Sandberg |
| 6,762,796 | B1 | 7/2004 | Nakajoh et al. |
| 6,762,798 | B1 | 7/2004 | Messer et al. |
| 6,802,056 | B1 | 10/2004 | Chaiken et al. |
| 6,847,649 | B2 | 1/2005 | Sutanto |
| 6,850,533 | B2 | 2/2005 | Gerszberg et al. |
| 6,856,330 | B1 | 2/2005 | Chew et al. |
| 6,873,877 | B1 | 3/2005 | Tobias et al. |
| 6,895,573 | B2 | 5/2005 | Norgaard et al. |
| 6,938,254 | B1 | 8/2005 | Mathur et al. |
| 6,941,341 | B2 | 9/2005 | Logston et al. |
| 6,944,185 | B2 | 9/2005 | Patki et al. |
| 6,948,175 | B1 | 9/2005 | Fong et al. |
| 6,948,183 | B1 | 9/2005 | Peterka |
| 6,952,836 | B1 | 10/2005 | Donlan et al. |
| 6,968,364 | B1 | 11/2005 | Wong et al. |
| 6,973,050 | B2 | 12/2005 | Birdwell et al. |
| 6,996,808 | B1 | 2/2006 | Niewiadomski et al. |
| 7,010,796 | B1 | 3/2006 | Strom et al. |
| 7,039,633 | B1 | 5/2006 | Dey et al. |
| 7,055,146 | B1 | 5/2006 | Durr et al. |
| 7,058,964 | B2 | 6/2006 | Khandelwal et al. |
| 7,068,597 | B1 | 6/2006 | Fijolek et al. |
| 7,080,356 | B2 | 7/2006 | Atallah et al. |
| 7,096,459 | B2 | 8/2006 | Keller et al. |
| 7,111,072 | B1 | 9/2006 | Matthews et al. |
| 7,137,106 | B2 | 11/2006 | Herman et al. |
| 7,146,305 | B2 | 12/2006 | Made et al. |
| 7,158,993 | B1 | 1/2007 | Schwabe |
| 7,181,725 | B1 | 2/2007 | Posegga et al. |
| 7,194,249 | B2 | 3/2007 | Phillips et al. |
| 7,203,869 | B2 | 4/2007 | Gwak |
| 7,213,213 | B2 | 5/2007 | Sekiguchi et al. |
| 7,216,170 | B2 | 5/2007 | Ludvig et al. |
| 7,240,104 | B2 | 7/2007 | Gautney |
| 7,266,726 | B1 | 9/2007 | Ladd et al. |
| 7,290,253 | B1 | 10/2007 | Agesen |

(56) References Cited

U.S. PATENT DOCUMENTS

| | | |
|---|---|---|
| 7,316,003 B1 | 1/2008 | Dulepet et al. |
| 7,328,333 B2 | 2/2008 | Kawano et al. |
| 7,366,286 B1 | 4/2008 | Shenoi |
| 7,370,322 B1 | 5/2008 | Matena et al. |
| 7,394,473 B2 | 7/2008 | Asai |
| 7,401,324 B1 | 7/2008 | Dmitriev |
| 7,478,341 B2 | 1/2009 | Dove |
| 7,487,534 B1 | 2/2009 | Peterka et al. |
| 7,546,602 B2 | 6/2009 | Hejlsberg et al. |
| 7,552,450 B1 | 6/2009 | Evans et al. |
| 7,581,012 B2 | 8/2009 | Shiouchi et al. |
| 7,606,529 B1 | 10/2009 | Swan et al. |
| 7,698,606 B2 | 4/2010 | Ladd et al. |
| 7,814,544 B1 | 10/2010 | Wilhelm |
| 7,945,902 B1 | 5/2011 | Sahoo |
| 8,024,607 B2 | 9/2011 | Ladd et al. |
| 8,042,113 B2 | 10/2011 | Clohessy et al. |
| 8,046,636 B2 | 10/2011 | Ladd et al. |
| 8,265,028 B2 | 9/2012 | Davies et al. |
| 8,302,111 B2 | 10/2012 | Ladd et al. |
| 8,321,723 B2 | 11/2012 | Ladd et al. |
| 8,599,797 B2 | 12/2013 | Pelkonen |
| 8,724,588 B2 | 5/2014 | Li et al. |
| 8,750,710 B1 | 6/2014 | Hirt et al. |
| 8,799,723 B2 | 8/2014 | Ladd et al. |
| 8,880,071 B2 | 11/2014 | Taaghol et al. |
| 8,989,297 B1 | 3/2015 | Lou et al. |
| 8,997,136 B2 | 3/2015 | Brooks et al. |
| 9,001,789 B2 | 4/2015 | Hosobe |
| 9,185,341 B2 | 11/2015 | Hardin |
| 9,300,445 B2 | 3/2016 | Hardin |
| 9,564,932 B1 | 2/2017 | Pack et al. |
| 9,596,593 B2 | 3/2017 | Li et al. |
| 9,612,816 B2 | 4/2017 | Choi et al. |
| 9,654,149 B2 | 5/2017 | Piipponen et al. |
| 9,706,512 B2 | 7/2017 | Suh |
| 9,769,692 B2 | 9/2017 | Freda et al. |
| 9,807,778 B2 | 10/2017 | Ma et al. |
| 9,813,148 B2 | 11/2017 | Syed et al. |
| 9,894,659 B1 * | 2/2018 | Wang et al. ...... H04W 72/0473 |
| 9,918,260 B2 * | 3/2018 | Marinier et al. .. H04W 36/0083 |
| 9,948,349 B2 | 4/2018 | Malach |
| 10,009,431 B2 | 6/2018 | Holtmanns |
| 10,135,730 B2 | 11/2018 | Chou |
| 10,164,858 B2 | 12/2018 | Gunasekara et al. |
| 10,375,629 B2 | 8/2019 | Zhang |
| 10,506,456 B2 | 12/2019 | Lou et al. |
| 10,506,499 B2 | 12/2019 | Keller et al. |
| 10,680,883 B2 | 6/2020 | Hall et al. |
| 10,693,687 B1 | 6/2020 | Kushnir |
| 10,924,825 B2 | 2/2021 | Das et al. |
| 11,026,004 B2 | 6/2021 | Das |
| 11,044,597 B2 | 6/2021 | Wong et al. |
| 11,102,560 B2 | 8/2021 | Hoole et al. |
| 11,129,213 B2 | 9/2021 | Vaidya et al. |
| 11,405,797 B2 | 8/2022 | Vaidya et al. |
| 11,432,284 B2 | 8/2022 | Hmimy et al. |
| 2001/0007138 A1 | 7/2001 | Iida et al. |
| 2001/0049691 A1 | 12/2001 | Asazu |
| 2002/0009149 A1 | 1/2002 | Rodriguez et al. |
| 2002/0032754 A1 | 3/2002 | Logston et al. |
| 2002/0034193 A1 | 3/2002 | Patki et al. |
| 2002/0038358 A1 | 3/2002 | Sweatt, III et al. |
| 2002/0040470 A1 | 4/2002 | Guthrie et al. |
| 2002/0044567 A1 | 4/2002 | Voit et al. |
| 2002/0044569 A1 | 4/2002 | Kwok et al. |
| 2002/0049978 A1 | 4/2002 | Rodriguez et al. |
| 2002/0052977 A1 | 5/2002 | Stall |
| 2002/0073244 A1 | 6/2002 | Davies et al. |
| 2002/0083214 A1 | 6/2002 | Heisig et al. |
| 2002/0112090 A1 | 8/2002 | Bennett et al. |
| 2002/0126144 A1 | 9/2002 | Chenede |
| 2002/0144193 A1 | 10/2002 | Hicks et al. |
| 2002/0170033 A1 | 11/2002 | Chen |
| 2002/0174430 A1 | 11/2002 | Ellis et al. |
| 2002/0174433 A1 | 11/2002 | Baumgartner et al. |
| 2002/0191028 A1 | 12/2002 | Senechalle et al. |
| 2002/0198868 A1 | 12/2002 | Kinzhalin et al. |
| 2003/0005454 A1 | 1/2003 | Rodriguez et al. |
| 2003/0009765 A1 | 1/2003 | Linden et al. |
| 2003/0009769 A1 | 1/2003 | Hensgen et al. |
| 2003/0037331 A1 | 2/2003 | Lee |
| 2003/0041291 A1 | 2/2003 | Hashem et al. |
| 2003/0056155 A1 | 3/2003 | Austen et al. |
| 2003/0056217 A1 | 3/2003 | Brooks |
| 2003/0061240 A1 | 3/2003 | Mccann et al. |
| 2003/0081664 A1 | 5/2003 | Lu et al. |
| 2003/0105995 A1 | 6/2003 | Schroath et al. |
| 2003/0107604 A1 | 6/2003 | Ording |
| 2003/0110331 A1 | 6/2003 | Kawano et al. |
| 2003/0110511 A1 | 6/2003 | Schutte et al. |
| 2003/0121055 A1 | 6/2003 | Kaminski et al. |
| 2003/0122879 A1 | 7/2003 | Inui et al. |
| 2003/0140285 A1 | 7/2003 | Wilkie |
| 2003/0163811 A1 | 8/2003 | Luehrs |
| 2003/0181241 A1 | 9/2003 | Oakes et al. |
| 2003/0188320 A1 | 10/2003 | Shing |
| 2003/0204848 A1 | 10/2003 | Cheng et al. |
| 2003/0217197 A1 | 11/2003 | Chan et al. |
| 2003/0217365 A1 | 11/2003 | Caputo |
| 2003/0229899 A1 | 12/2003 | Thompson et al. |
| 2003/0229900 A1 | 12/2003 | Reisman |
| 2003/0231855 A1 | 12/2003 | Gates et al. |
| 2004/0003400 A1 | 1/2004 | Carney et al. |
| 2004/0034697 A1 | 2/2004 | Fairhurst et al. |
| 2004/0040041 A1 | 2/2004 | Crawford |
| 2004/0073944 A1 | 4/2004 | Booth |
| 2004/0078695 A1 | 4/2004 | Bowers et al. |
| 2004/0078829 A1 | 4/2004 | Patel et al. |
| 2004/0083464 A1 | 4/2004 | Cwalina et al. |
| 2004/0098730 A1 | 5/2004 | Foote et al. |
| 2004/0103434 A1 | 5/2004 | Ellis |
| 2004/0107451 A1 | 6/2004 | Khandelwal et al. |
| 2004/0143836 A1 | 7/2004 | McCormack et al. |
| 2004/0158649 A1 | 8/2004 | Ophir et al. |
| 2004/0158829 A1 | 8/2004 | Beresin et al. |
| 2004/0181811 A1 | 9/2004 | Rakib |
| 2004/0186603 A1 | 9/2004 | Sanford et al. |
| 2004/0187152 A1 | 9/2004 | Francis et al. |
| 2004/0187156 A1 | 9/2004 | Palm et al. |
| 2004/0199903 A1 | 10/2004 | Iizuka |
| 2004/0205339 A1 | 10/2004 | Medin |
| 2004/0218736 A1 | 11/2004 | Fang et al. |
| 2004/0236759 A1 | 11/2004 | Young |
| 2004/0261092 A1 | 12/2004 | Addington et al. |
| 2004/0261114 A1 | 12/2004 | Addington et al. |
| 2004/0261116 A1 | 12/2004 | Mckeown et al. |
| 2004/0261126 A1 | 12/2004 | Addington et al. |
| 2005/0015799 A1 | 1/2005 | Park |
| 2005/0021766 A1 | 1/2005 | Mckeowen et al. |
| 2005/0027851 A1 | 2/2005 | Mckeown et al. |
| 2005/0034159 A1 | 2/2005 | Ophir et al. |
| 2005/0063317 A1 | 3/2005 | Risberg et al. |
| 2005/0071818 A1 | 3/2005 | Reissman et al. |
| 2005/0114900 A1 | 5/2005 | Ladd et al. |
| 2005/0120385 A1 | 6/2005 | Stalker |
| 2005/0132346 A1 | 6/2005 | Tsantilis |
| 2005/0160045 A1 | 7/2005 | Watanabe et al. |
| 2005/0162267 A1 | 7/2005 | Khandelwal et al. |
| 2005/0177832 A1 | 8/2005 | Chew |
| 2005/0273762 A1 | 12/2005 | Lesh |
| 2006/0005183 A1 | 1/2006 | Minear et al. |
| 2006/0020950 A1 | 1/2006 | Ladd et al. |
| 2006/0036750 A1 | 2/2006 | Ladd et al. |
| 2006/0047957 A1 | 3/2006 | Helms et al. |
| 2006/0070051 A1 | 3/2006 | Kuck et al. |
| 2006/0129947 A1 | 6/2006 | Hamzy et al. |
| 2006/0130107 A1 | 6/2006 | Gonder et al. |
| 2006/0130113 A1 | 6/2006 | Carlucci et al. |
| 2006/0143492 A1 | 6/2006 | Leduc et al. |
| 2006/0161946 A1 | 7/2006 | Shin |
| 2007/0094345 A1 | 4/2007 | Rabbers et al. |
| 2007/0207771 A1 | 9/2007 | Bowser et al. |
| 2007/0217436 A1 | 9/2007 | Markley et al. |

(56) References Cited

U.S. PATENT DOCUMENTS

| | | |
|---|---|---|
| 2007/0261090 A1 | 11/2007 | Miller et al. |
| 2007/0288897 A1 | 12/2007 | Branda et al. |
| 2007/0294673 A1 | 12/2007 | Guerrera et al. |
| 2008/0098212 A1 | 4/2008 | Helms et al. |
| 2008/0101291 A1 | 5/2008 | Jiang et al. |
| 2008/0178153 A1 | 7/2008 | Fox et al. |
| 2008/0196011 A1 | 8/2008 | Bhandari et al. |
| 2008/0256510 A1 | 10/2008 | Auerbach |
| 2008/0279287 A1 | 11/2008 | Asahina |
| 2008/0288930 A1 | 11/2008 | Chen et al. |
| 2009/0082060 A1* | 3/2009 | Namatame ............. 455/552.1 |
| 2009/0110088 A1 | 4/2009 | Di Giandomenico et al. |
| 2009/0119735 A1 | 5/2009 | Dounaevski et al. |
| 2009/0176490 A1 | 7/2009 | Kazmi et al. |
| 2009/0217326 A1 | 8/2009 | Hasek |
| 2009/0222867 A1 | 9/2009 | Munetsugu |
| 2010/0008235 A1 | 1/2010 | Tinnakornsrisuphap et al. |
| 2010/0035610 A1 | 2/2010 | Narang et al. |
| 2010/0064330 A1 | 3/2010 | Yu et al. |
| 2010/0176912 A1 | 7/2010 | Sears et al. |
| 2010/0178912 A1 | 7/2010 | Gunnarsson et al. |
| 2011/0117917 A1 | 5/2011 | Gresset et al. |
| 2011/0124335 A1 | 5/2011 | Martin et al. |
| 2011/0190000 A1* | 8/2011 | Kwun ............................ 455/450 |
| 2011/0207456 A1 | 8/2011 | Radulescu et al. |
| 2011/0281583 A1* | 11/2011 | Hole ............................ 455/436 |
| 2012/0076009 A1 | 3/2012 | Pasko |
| 2012/0083207 A1 | 4/2012 | Rofougaran et al. |
| 2012/0224563 A1 | 9/2012 | Zisimopoulos et al. |
| 2012/0246255 A1 | 9/2012 | Walker et al. |
| 2012/0275315 A1 | 11/2012 | Schlangen et al. |
| 2013/0010686 A1 | 1/2013 | Shatzkamer et al. |
| 2013/0077515 A1* | 3/2013 | Jung et al. ..................... 370/252 |
| 2013/0077554 A1 | 3/2013 | Gauvreau et al. |
| 2013/0079003 A1 | 3/2013 | Nagaraja et al. |
| 2013/0143555 A1* | 6/2013 | Singh et al. ...... H04W 36/0077 |
| 2013/0156115 A1 | 6/2013 | Petrovic |
| 2013/0178225 A1 | 7/2013 | Xing |
| 2013/0189990 A1 | 7/2013 | Kim et al. |
| 2013/0201316 A1 | 8/2013 | Binder et al. |
| 2013/0215870 A1* | 8/2013 | Hosobe ............. H04W 36/0061 |
| 2013/0247027 A1 | 9/2013 | Shah et al. |
| 2013/0252616 A1 | 9/2013 | Murakami |
| 2013/0267229 A1 | 10/2013 | Gopalakrishnan |
| 2013/0279914 A1 | 10/2013 | Brooks |
| 2013/0322504 A1 | 12/2013 | Asati et al. |
| 2013/0337794 A1* | 12/2013 | Kojima .......................... 455/418 |
| 2014/0073304 A1* | 3/2014 | Brisebois et al. ............. 455/418 |
| 2014/0087715 A1* | 3/2014 | Suzuki et al. ........ H04W 24/10 |
| 2014/0148107 A1 | 5/2014 | Maltsev et al. |
| 2014/0282704 A1 | 9/2014 | Tumuluru et al. |
| 2014/0282802 A1 | 9/2014 | Bowler et al. |
| 2014/0308986 A1 | 10/2014 | Yang et al. |
| 2014/0354442 A1 | 12/2014 | Maity et al. |
| 2014/0370895 A1 | 12/2014 | Pandey et al. |
| 2015/0063137 A1* | 3/2015 | Shen et al. ............ H04W 24/02 |
| 2015/0085853 A1 | 3/2015 | Smith et al. |
| 2015/0087354 A1 | 3/2015 | Ianev et al. |
| 2015/0098349 A1* | 4/2015 | Wei et al. .............. H04W 16/14 |
| 2015/0156777 A1 | 6/2015 | Negus et al. |
| 2015/0181363 A1 | 6/2015 | Khorami |
| 2015/0201088 A1 | 7/2015 | Wu et al. |
| 2015/0208290 A1 | 7/2015 | Seo et al. |
| 2015/0229584 A1 | 8/2015 | Okamoto et al. |
| 2015/0365178 A1 | 12/2015 | Maattanen et al. |
| 2016/0007138 A1 | 1/2016 | Palanisamy et al. |
| 2016/0013855 A1 | 1/2016 | Campos et al. |
| 2016/0014651 A1* | 1/2016 | Wellington ....... H04W 36/0083 |
| 2016/0020835 A1 | 1/2016 | Stadelmeier et al. |
| 2016/0021595 A1 | 1/2016 | Czaja et al. |
| 2016/0073344 A1 | 3/2016 | Vutukuri et al. |
| 2016/0094421 A1 | 3/2016 | Bali et al. |
| 2016/0127434 A1 | 5/2016 | Yoon et al. |
| 2016/0128072 A1 | 5/2016 | Rajagopal et al. |
| 2016/0212632 A1 | 7/2016 | Katamreddy et al. |
| 2016/0259923 A1 | 9/2016 | Papa et al. |
| 2016/0373974 A1 | 12/2016 | Gomes et al. |
| 2017/0019144 A1 | 1/2017 | Malach |
| 2017/0055186 A1* | 2/2017 | Donepudi et al. ............................ H04W 36/0061 |
| 2017/0094527 A1 | 3/2017 | Shattil et al. |
| 2017/0111846 A1 | 4/2017 | Kang |
| 2017/0118527 A1 | 4/2017 | Wachob et al. |
| 2017/0149937 A1 | 5/2017 | Ren et al. |
| 2017/0155703 A1 | 6/2017 | Hao et al. |
| 2017/0164068 A1 | 6/2017 | Wachob et al. |
| 2017/0201912 A1 | 7/2017 | Zingler et al. |
| 2017/0208488 A1 | 7/2017 | Hwang et al. |
| 2017/0208540 A1 | 7/2017 | Egner et al. |
| 2017/0245281 A1 | 8/2017 | Zuckerman et al. |
| 2017/0265220 A1 | 9/2017 | Andreoli-Fang et al. |
| 2017/0316233 A1 | 11/2017 | Kherani et al. |
| 2018/0063813 A1 | 3/2018 | Gupta et al. |
| 2018/0092142 A1 | 3/2018 | Han et al. |
| 2018/0098245 A1 | 4/2018 | Livanos et al. |
| 2018/0146408 A1 | 5/2018 | Meylan et al. |
| 2018/0167128 A1 | 6/2018 | Kinamon et al. |
| 2018/0184337 A1 | 6/2018 | Jin et al. |
| 2018/0213452 A1 | 7/2018 | Kim et al. |
| 2018/0269974 A1 | 9/2018 | Luciano |
| 2018/0316563 A1 | 11/2018 | Kumar et al. |
| 2018/0331935 A1 | 11/2018 | Ross et al. |
| 2018/0338277 A1 | 11/2018 | Byun et al. |
| 2018/0343685 A1 | 11/2018 | Hart et al. |
| 2018/0351665 A1 | 12/2018 | Fukuta et al. |
| 2018/0351809 A1 | 12/2018 | Meredith et al. |
| 2018/0375887 A1 | 12/2018 | Dezent et al. |
| 2019/0007870 A1 | 1/2019 | Gupta et al. |
| 2019/0028141 A1 | 1/2019 | Padden et al. |
| 2019/0037630 A1 | 1/2019 | Zhang et al. |
| 2019/0053193 A1 | 2/2019 | Park et al. |
| 2019/0075023 A1 | 3/2019 | Sirotkin |
| 2019/0082447 A1 | 3/2019 | Harsha et al. |
| 2019/0082501 A1 | 3/2019 | Vesely et al. |
| 2019/0098582 A1* | 3/2019 | Mackenzie et al. ............................ H04W 52/244 |
| 2019/0109643 A1 | 4/2019 | Campos et al. |
| 2019/0124572 A1 | 4/2019 | Park et al. |
| 2019/0124696 A1 | 4/2019 | Islam et al. |
| 2019/0141586 A1 | 5/2019 | Olsson et al. |
| 2019/0158975 A1 | 5/2019 | Petersen |
| 2019/0208380 A1 | 7/2019 | Shi et al. |
| 2019/0229974 A1 | 7/2019 | Campos et al. |
| 2019/0245740 A1 | 8/2019 | Kachhla |
| 2019/0253944 A1 | 8/2019 | Kim |
| 2019/0261264 A1 | 8/2019 | Lou et al. |
| 2019/0289470 A1 | 9/2019 | Vaidya et al. |
| 2019/0319814 A1 | 10/2019 | Das |
| 2019/0319858 A1 | 10/2019 | Das et al. |
| 2019/0320250 A1 | 10/2019 | Hoole et al. |
| 2019/0320322 A1 | 10/2019 | Jayawardene et al. |
| 2019/0320494 A1 | 10/2019 | Jayawardene et al. |
| 2019/0349848 A1 | 11/2019 | Bali |
| 2019/0357037 A1 | 11/2019 | Velev et al. |
| 2019/0357199 A1 | 11/2019 | Ali et al. |
| 2019/0379455 A1 | 12/2019 | Wang et al. |
| 2020/0021689 A1 | 1/2020 | Sultana et al. |
| 2020/0053545 A1 | 2/2020 | Wong et al. |
| 2020/0091608 A1 | 3/2020 | Alpman et al. |
| 2020/0112888 A1 | 4/2020 | Glennon et al. |
| 2020/0120724 A1 | 4/2020 | Vaidya et al. |
| 2020/0154388 A1 | 5/2020 | Koshimizu et al. |
| 2020/0214065 A1 | 7/2020 | Tomala et al. |
| 2020/0280836 A1 | 9/2020 | Velev et al. |
| 2021/0028915 A1 | 1/2021 | Jia et al. |
| 2021/0029759 A1 | 1/2021 | Tang |
| 2021/0112551 A1 | 4/2021 | Anderson et al. |
| 2021/0175925 A1 | 6/2021 | Tarighat Mehrabani |
| 2021/0176665 A1 | 6/2021 | Lan et al. |
| 2021/0250196 A1 | 8/2021 | Das et al. |
| 2021/0281993 A1 | 9/2021 | Tiwari et al. |
| 2021/0336815 A1 | 10/2021 | Das et al. |

(56) References Cited

U.S. PATENT DOCUMENTS

| | | |
|---|---|---|
| 2021/0337543 A1 | 10/2021 | Das et al. |
| 2022/0078624 A1 | 3/2022 | Hong |
| 2022/0132524 A1 | 4/2022 | Mueck et al. |

FOREIGN PATENT DOCUMENTS

| | | |
|---|---|---|
| EP | 1046259 A2 | 10/2000 |
| GB | 2548796 A | 10/2017 |
| JP | 2006325206 A | 11/2006 |
| JP | 2011254495 A | 12/2011 |
| JP | 2016511998 A | 4/2016 |
| JP | 2017118483 A | 6/2017 |
| JP | 2018510589 A | 4/2018 |
| KR | 20160097917 A | 8/2016 |
| WO | WO-0024192 A1 | 4/2000 |
| WO | WO-0213039 A1 | 2/2002 |
| WO | WO-2004045125 A2 | 5/2004 |
| WO | WO-2015147707 A1 | 10/2015 |
| WO | WO-2017186294 A1 | 11/2017 |
| WO | WO-2018131488 A1 | 7/2018 |
| WO | WO-2018131904 A1 | 7/2018 |

OTHER PUBLICATIONS

Method and Apparatus for Controlling Collision of Physical Cell Identifier; KR 20160107419 A (Year: 2016).*
Method And Apparatus For Automatically Allocating Physical Cell Identity In Wireless Communication System; KR 101890156 B1 (Year: 2018).*
Method and Apparatus for Controlling Physical Cell Identifier; KR 20160123469 A (Year: 2016).*
Channel Evacuation Procedures for Wireless Networks Deployed in Dynamic Shared Spectrum; WO 2014078676 A2 (Year: 2014).*
Marinier et al. (WO 2010120837 A1): Resolving Physical Layer Cell Identity Confusion For Providing Inbound Mobility To Closed Subscriber Group (CSG) By Identifying Cell Global Identity (CGI) Of Neighbor CSG Cell If First And Second Sets Of System Information Are Similar. (Year: 2010).*
Wang et al. (WO 2014029107 A1): PCI Confusion Detection Method, User Equipment, and Base Station. (Year: 2014).*
Feng, Wenbin (WO 2016095461 A1); Handling Method and Detection Base Station for Physical Cell Identity Confusion. (Year: 2016).*
Hwang Hyun et al. (KR 20160107419 A): Method and Apparatus for Controlling Collision of Physical Cell Identifier. (Year: 2016).*
3GPP., "Evolved Universal Terrestrial Radio Access (E-UTRA), Carrier Aggregation, Base Station (BS) radio transmission and reception (Release 10)", Technical Specification Group Radio Access Network, Technical Report (TR 36.808 V10.1.0), 2013, 31 pages.
3GPP., "Radio Resource Control (RRC) protocol specification (Release 16)", Technical Specification Group Radio Access Network, TS 38.331 (V16.0.0), Mar. 2020, 832 pages.
3GPP., "RAN Adjusts Schedule for 2nd Wave of 5G Specifications (Release 16)", 2 pages, Retrieved from the internet [URL: https://www.3gpp.org/news-events/3gpp-news/2005-ran_r16_schedule].
3GPP TR 38.801 v.14.0.0 (Mar. 2017) 3rd Generation Partnership Project; Technical Specification Group Radio Access Network; Study on New Radio Access Technology: Radio Access Architecture and Interfaces (Release 14), 91 pages.
3GPP TS 23.234 v13.1.0, "3GPP system to Wireless Local Area Network (WLAN) interworking; System description (Release 13)" 2017, 18 pages.
3GPP TS 23.501 v.15.4.0 (Dec. 2018) 3rd Generation Partnership Project; Technical Specification Group Services and System Aspects; System Architecture for the 5G System; Stage 2; Release 15, 236 pages.
3GPP TS 23.502 3rd Generation Partnership Project; Technical Specification Group Services and System Aspects; Procedures for the 5G System; Stage 2; v. 16.0.0, (Mar. 2019) 420 pages.
3GPP TS 32.300 V15.0.0 (Jun. 2018), Technical Specification—3rd Generation Partnership Project; Technical Specification Group Services and System Aspects; Telecommunication management; Configuration Management (CM); Name convention for managed objects, (Release 15) Jun. 2018, 27 pages.
3GPP TS 36.300 3rd Generation Partnership Project; Technical Specification Group Radio Access Network; Evolved Universal Terrestrial Radio Access (E-UTRA) and Evolved Universal Terrestrial Radio Access Network, (Dec. 2017) 338 pages.
3GPP TS 36.413 V14.4. entitled "3rd Generation Partnership Project; Technical Specification Group Radio Access Network; Evolved Universal Terrestrial Radio Access Network (E-UTRAN); S1 Application Protocol (S1AP) (Release 14)" dated Sep. 2017.
3GPP TS 36.413, V14.4.1, "3rd Generation Partnership Project; Technical Specification Group Radio Access Network; Evolved Universal Terrestrial Radio Access Network (E-UTRAN); S1 Application Protocol (S1AP) (Release 14)", 2018.
3GPP TS 37.213 LTE; Physical Layer Procedures For Shared Spectrum Channel Access, version 15.0.0 Release 15, (Jul. 2018) 22 pages.
3GPP TS 38.306 3rd Generation Partnership Project; Technical Specification Group Radio Access Network; NR; User Equipment (UE) radio access capabilities (Release 15), (Dec. 2020) 60 pages.
3GPP TS 38.413 3rd Generation Partnership Project; Technical Specification Group Radio Access Network; NG-RAN; NG Application Protocol (NGAP) (Release 16), (Dec. 2019) 335 pages.
3GPP TS 38.473 V15.1.1 (Apr. 2018) "3rd Generation Partnership Project; Technical Specification Group Radio Access Network," TS 38.473 (v15.0.0), Dec. 2017, NG-RAN, F1 application protocol (F1AP), Release 15, 90 pages.
3GPP TS 38.473 V15.A.A (Apr. 2018) 3rd Generation Partnership Project; Technical Specification Group Radio Access Network; NG-RAN; F1 application protocol (F1AP) (Release 15), 106 pages.
3GPP TS 38.889 3rd Generation Partnership Project; Technical Specification Group Radio Access Network; Study on NR-based Access to Unlicensed Spectrum; Release 16, (Nov. 2018), 120 pages.
3GPP., "Study on New Radio Access Technology, Radio Interface Protocol Aspects (Release 14)", Technical Specification Group Radio Access Network, Technical Report (TR 38.804), V14.0.0 (Mar. 2017), 57 pages.
Allen, et al., The Case for Run-Time Types in Generic Java, Rice University 2002 pp. 1-6.
Article 5 of the Radio Regulations (edition 2001), Introduction to International Radio Regulations, 161 pages.
Bertenyi B., 3GPP TSG RAN, RAN Adjusts Schedule for2nd Wave of 5G Specifications, The Mobile Broadband Standard, A Global Initiative, Dec. 14, 2018, retrieved from the Internet: (https://www.3gpp.org/news-events/3gpp-news/2005-ran_r16_schedule), 2 pages.
Bluetooth Core Specification, Jun. 30, 2010, Version 4.0, 2302 pages.
Chapter 4—Window Manager for Mac ©. Apple Computer. Inc., Jul. 11, 1996, 4 pages.
Chapter 7—Window Management, SOL library Documentation vU.3-rev 1, Sep. 2001, 2 pages.
Chou, et al., Open CPE Architecture: A Solution to the Delivery of Integrated Services over Broadband, Intel Communication Group, Corp. pp. 1-10, 2001.
Curran K., et al., "The Use of Dynamically Reconfigurable Protocol Stacks for Streaming Multimedia to Mobile Devices," 8th IEEE International Conference on Communication Systems Singapore, Nov. 25-28, 2002, pp. 947-951. URL: http://www.infm.ulst.ac.uk/.about.kevin/pubs.htm.
Day, "Java Media Framework Player API", Apr. 1997, XP-002093309, www.javaworld.com.
Eldering, Charles, Customer Permises Epuipment Residential Broadband Networks, Jun. 1997, IEEE, p. 114-212.
Ellis, "Getting to Know the OpenCable Application Platform," Sun microsystems, Jun. 2006.
ETSI TS 123 502 v15.2.0 (Jun. 2018) Technical Specification; 5G; Procedures for the 5G System; 311 pages.
Evain, "The Multimedia Home Platform" EBU Review—Technical, European Broadcasting Union. Brussels, BE, No. 275, Mar. 21, 1998, pp. 4-10, XP000767493.

(56) References Cited

OTHER PUBLICATIONS

GSMA Road to 5G: Introduction and Migration, Apr. 2018, 54 pages.
Han R., et al., Websplitter, 2000, pp. 13.
Hentschel et al., Video Quality Of Service For Consumer Terminal A Novel System For Programmable Componets, 2002, IEEE, pp. 28-29.
Hutchings D. R., et al., New Operation for Display Space Management and Window Management, Technical Report GIT-GVU-02-18, Aug. 2002, 20 pages.
IEEE 802.11 standard, 1997, URL: http://www.ieeexplore.ieee.org/documenU654779, 459 pages.
IEEE Standards 802.3, 2008, 27 pages.
IEEE Std. 802.15.4-2015; IEEE Standard for Low-Rate Wireless Networks, approved Dec. 5, 2015, 708 pages.
Interworking Wi-Fi and Mobile Networks, The Choice of Mobility Solutions, White Paper, 2013, 13 pages.
Java Media Players, V.1.0.5, May 5, 1998, X940410443, Sun Microsystems, Inc.
"JMFRegistry User's Guide", Sun Microsystems, XP-002573305, Mar. 8, 2010.
Kar, et al., Cable's Home Digital Network Interface Of Choice, 1999, Cable Television Lab. IEEE, pp. 34-35.
Luu J, "MainWin and Window Managers," Mainsoft, 2000, 5 pages.
Mayer, "Analyzing the Use of Interfaces in Large OO Projects," ACM, Oct. 2003.
Motorola, Control Management Module (CMM 2000) information sheets: 4 pages; C Motorola, Inc. 2001; https://www.motorola.com/broadband.
Motorola, HFC Manager, Integrated Element Management System information sheets; 4 pages; .COPYRGT. Motorola, Inc. 2003; https://www.motorola.com/broadband.
Motorola Product Detail, HFC Manager HFC Element Management System; 1 page: © Motorola, Inc. 2004; https://www.motorola.com/lbroadband.
Nokia 5G New Radio (NR): Physical Layer Overview and Performance, IEEE Communication Theory Workshop, 2018 by A. Ghosh, May 15, 2018, 38 pages.
OCAP Applications in Detail (pp. 1-8), www.tvwithoutborders.com, Feb. 13, 2010.
OpenCable Application Platform Specification ("OpenCable" copyright 2001-2003 pp. 1-398).
OpenCable Host Device, Core Functional Requirements, Issued Specification (OC-SP-HOST-CFR-I14-030905), Sep. 5, 2003, 81 pages.
Scientific Atlanta, ROSA Network Management System and Element Management web pages, 10 pages, © Scientific Atlanta 2006, www.scientificatlanta.com.
Scientific Atlanta, Subscriber Networks; Explorer.RTM. 3100HD High Definition DHCT information pages; Oct. 2001; 2 pgs.
Scientific Atlanta, Subscriber Networks; Explorer.RTM. 4200 Home Gateway information pages; Sep. 2003; 3 pgs.
Scientific Atlanta, Subscriber Products; Explorer.RTM. 8000. TM. Home Entertainment Server information pages; Nov. 2003; 4 pgs.
Wi-Fi Agile Multiband Specification Version 1.2 dated Dec. 31, 2018.
Wi-Fi Certified Agile MultibandTM Technology Overview, Dec. 2017, 9 pages.
Wi-Fi Direct, "Wi-Fi Peer-to-Peer (P2P) Specification," Wi-Fi Alliance, Version 1.5, 2014, 183 pages.
Xie, et al., "MAPO: Mining API Usages from Open Source Repositories," ACM, May 2006.
Maamoun K. M. et al., "A Survey and a Novel Scheme for RoF-PON as FTTx Wireless Services," 2009 6th InternationalSymposium on High Capacity Optical Networks and Enabling Technologies(HONET), IEEE, 2009, pp. 246-253.

\* cited by examiner

APPARATUS AND METHODS FOR CELL IDENTIFICATION IN WIRELESS NETWORKS

PRIORITY

This application is a continuation of, and claims priority to, co-owned U.S. patent application Ser. No. 16/601,345 of the same title filed on Oct. 14, 2019, and issuing as U.S. Pat. No. 11,129,213 on Sep. 21, 2021, which claims priority to U.S. Provisional Patent Application Ser. Nos. 62/745,065 and 62/752,002 filed Oct. 12, 2018 and Oct. 29, 2018, respectively, each entitled "APPARATUS AND METHODS FOR CELL IDENTIFICATION IN WIRELESS NETWORKS," each incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless devices and networks thereof, and specifically in one exemplary aspect to identification of one or more cells within one or more RANs (Radio Area Networks) of a radio network utilizing licensed and/or unlicensed spectrum.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
| --- | --- |
| 3G | 850 MHz Cellular, Band 5 (GSM/GPRS/EDGE). |
|  | 1900 MHz PCS, Band 2 (GSM/GPRS/EDGE). |
|  | 850 MHz Cellular, Band 5 (UMTS/HSPA+ up to 21 |
|  | 1900 MHz PCS, Band 2 (UMTS/HSPA+ up to 21 |
| 4G | 700 MHz Lower B/C, Band 12/17 (LTE). |
|  | 850 MHz Cellular, Band 5 (LTE). |
|  | 1700/2100 MHz AWS, Band 4 (LTE). |
|  | 1900 MHz PCS, Band 2 (LTE). |
|  | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
| --- | --- | --- | --- | --- |
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |

TABLE 2-continued

| Frequency range | Type | Center frequency | Availability | Licensed users |
|---|---|---|---|---|
| 24 GHz-24.25 GHz | B | 24.125 GHz | | Worldwide Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs (e.g., Wi-Fi) and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a node or "hotspot," a physical location at which the user may obtain access by connecting to modems, routers, APs, etc. that are within wireless range.
5G New Radio (NR) and NG-RAN (Next Generation Radio Area Network)

NG-RAN or "NextGen RAN (Radio Area Network)" is part of the 3GPP "5G" next generation radio system. 3GPP is currently specifying Release 15 NG-RAN, its components, and interactions among the involved nodes including so-called "gNBs" (next generation Node B's or eNBs). NG-RAN will provide high-bandwidth, low-latency wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

The NG-RAN (5G) System architecture is designed to support data connectivity and services offering with higher throughput and lower latency. FIG. 1 shows the 5G architecture 100 as defined in 3GPP TS 23.501 (FIG. 4.2.3-1 thereof).

An existing 3GPP LTE/LTE-A/EPC (i.e., 4G or 4.5G system) cannot be updated to support 5G; hence, 3GPP has also defined interworking procedures between such 4G/4.5G and 5G systems. FIG. 2a shows the architecture 200 for interworking between 5GS and EPC/E-UTRAN as defined in TS 23.501 (FIG. 4.3.1-1 thereof), specifically the non-roaming architecture for interworking between the 5GS and the EPC/E-UTRAN. Two different RAN technologies are supported; i.e., E-UTRAN (4G/4.5G) 202, and 5G (NG-RAN) 204. FIG. 2b shows a roaming architecture counterpart (i.e., with HPLMN and visited network (VPLMN).

In LTE and 5G NR, for a given cell, the cognizant eNB/gNB broadcasts a Physical Cell ID (PCI). The Physical Cell ID is the identification of a cell at the physical layer (PHY). Under LTE (pre Release 15), up to 504 unique PCIs can be specified. 5G NR (Release 15 and beyond) presently allows up to 1008 unique PCIs.

However, a given PLMN (e.g., HPLMN or VPLMN, such as those described above with respect to FIGS. 1-2b) has many cells. But since the PCIs are rather limited in number, the notion of an ECGI (E-UTRAN Cell Global Identifier; LTE), and NCGI (NR Cell Global Identifier; 5G NR) was introduced, wherein a PLMN-ID is used in addition to the PCI to uniquely identify a given cell within a given PLMN (and also across it; i.e., inter-PLMN). The ECGI is constructed from the MCC (Mobile Country Code), MNC (Mobile Network Code) and the ECI (E-UTRAN Cell Identifier), while the NCGI is constructed from the PLMN identity to which the cell belongs and the NR Cell Identity (NCI) of the cell.

Typically, the UE 222 performs Measurement Reporting, under network directive, based on detected PCIs for a given EARFCN (E-UTRA Absolute Radio Frequency Channel Number) or frequency/set of frequencies. There may exist scenarios where in a given geographic area, two or more PLMNs broadcast the same PCI as seen by a UE. This situation leads to what is referred to as "PCI Confusion;" i.e., an ambiguity as to which PLMN a given PCI detected by a UE belongs.

Automatic Neighbor cell Relations (ANR) (see e.g., 3GPP TS 36.300) was developed to solve the foregoing issue. In ANR, an eNB/gNB—upon receiving Measurement Reports containing the PCI from the UE—instructs the RRC_CONNECTED mode UE to read all broadcast ECGI(s)/NCGI(s), TAC(s), RANAC(s), PLMN ID(s) and LTE/NR frequency band(s) of the cell identified via the reported PCI. Using this information, the eNB/gNB formulates a neighbor cell relationship, and can use this information to update the "whitelist" or "blacklist" and forward to the UE 222. Using this updated information, the UE can adjust its future Measurement Reports. This update information can also be used across PLMN operators to coordinate PCIs of cells, so that the aforementioned ambiguity or confusion is avoided (i.e., two PLMNs with common coverage where a UE might be located will not utilize the same PCI).

3GPP TS 23.501 and TS 23.502 also support a mode known as MICO (Mobile Initiated Connection Only) which allows the network to control Registration Areas, Paging and other related features for certain devices which are expected to operate only in MO-only mode. However, MICO mode was designed for UEs which mostly have UL-heavy transmissions; e.g., IoT sensors. Although such devices could be limited in terms of mobility, it is not a strict requirement, and there is no mechanism determination of mobility (or lack thereof).

The Unlicensed Problem

As of the date of this disclosure, design of NR for Unlicensed spectrum (NR-U) is underway in 3GPP for Releases 15 and 16. NR-U is being defined for three (3) use-cases: (i) Carrier Aggregation (CA), (ii) Dual Connectivity (DC), and (iii) Standalone (SA). (Licensed) NR's design is used as the baseline for NR-U and as such, every NR-U cell will broadcast a PCI, as well as every licensed cell. Unlike licensed spectrum where a single operator owns a frequency range, unlicensed spectrum is open to all for use.

Accordingly, as shown in FIG. 2c, many different network operators (e.g., PLMN providers) could use same PCI at a given frequency within both the licensed and the unlicensed spectrum to identify their respective cells (i.e., $PCI_L$ and $PCI_U$, respectively as shown in FIG. 2c). Given the nature of spectrum, coordination among such PLMN providers cannot be assumed, and in fact given the ad hoc nature of unlicensed spectrum, it is likely that coordination will not exist.

Moreover, the foregoing issue is exacerbated due to the NR-U requirements to: a) perform LBT (Listen Before Talk) protocols to gain access to physical medium for transmission; see, e.g., 3GPP TS 38.889 (or TS 37.213 for LTE-LAA), and/or b) account for transmission failures, and implement resulting exponential back-off mechanisms.

Based on the foregoing, no viable mechanism for cell identifier/identity management within unlicensed environments (including for instance the 5G NR-U environment) currently exists.

SUMMARY

The present disclosure addresses the foregoing needs by providing, inter alia, methods and apparatus for providing optimized identification of cells, such as for example those supported by a 5G NR-U enabled gNB or its broader PLMN.

In a first aspect of the disclosure, a method for cell identification within a wireless network is described. In one embodiment, the method includes: identifying a set of candidate user devices (e.g., UE(s)) for which to apply the cell identifier resolution mechanism; instructing the identified set of user devices to perform a measurement protocol; and based on the results of the measurement protocol, configure at least one listing of cell identifiers.

In another embodiment, the method includes using at least one gNB to identify a set of candidate UE(s) for which to apply PCI confusion resolution mechanism; instructing, via the at least one gNB, the identified set of UEs to perform Measurement Reports taking LBT into account; and using Measurement Reports provided by UE to update the white/black lists to include/exclude unrelated PCIs.

In an additional aspect of the disclosure, computer readable apparatus is described. In one embodiment, the apparatus includes a storage medium configured to store one or more computer programs, and includes a program memory or HDD or SSD on a computerized device such as a CU of a 5G NR gNB. In one variant, the one or more computer programs are configured to evaluate whether a conflict between two PLMNs (e.g., a 5G NR licensed PLMN and a 5G NR-U unlicensed PLMN) exists, and invoke one or more resolution mechanisms as required.

In a further aspect, a wireless access node is disclosed. In one embodiment, the node comprises a computer program operative to execute on a digital processor apparatus, and configured to, when executed, obtain data from a control or network entity with which the node is associated, and based on the data, cause selective implementation of conflict resolution protocols within the population of user devices served by the access node.

In another embodiment, the node comprises a 3GPP-compliant gNB or eNB.

In another aspect of the disclosure, a method for identifying a subset of user devices (e.g., UEs) is disclosed. In one embodiment, the method includes inserting parametric data relating to a use scenario or context into a protocol message delivered to a base station or RAN (e.g., 5G gNB). The parametric data is extracted by the gNB and used to determine whether subsequent operations, such as Measurement Reporting, should be performed for each UE based thereon.

In another embodiment, a UE provides data (e.g., a "noMobilityRequired" parameter or field) to indicate that no mobility is required, via the UE-NR-Capability IE which is included in UECapabilityInformation message (the latter sent in response to UECapabilityInquiry message). Upon reception of the provided data, the cognizant gNB can determine whether the UE can support the PCI conflict resolution mechanism or not and hence when combined information received e.g., from the AMF (e.g., over N2-AP INITIAL CONTEXT SETUP REQUEST), the gNB can accurately decide whether or not and how to apply PCI conflict resolution mechanism for the UE.

In another aspect of the disclosure, a mobile computerized device is disclosed. In one embodiment, the device includes a 3GPP-compliant UE (user equipment) which is configured.

In an additional aspect of the disclosure, computer readable apparatus is described. In one embodiment, the apparatus includes a storage medium configured to store one or more computer programs, and includes a program memory or HDD or SSD on a computerized device such as a 5G NR gNB or AMF.

In yet another aspect, a system is disclosed. In one embodiment, the system includes (i) an HSS+UDM entity with NMR database, and (ii) one or more PCRE-enabled RAN or AMF entities which cooperate with the HSS+UDM entity to enable PCI conflict resolution in, inter alia, unlicensed 5G spectrum usage scenarios.

In another aspect of the disclosure, a method for limiting a scope of a PCI search is disclosed. In one embodiment, the method includes determining a number to which to limit the search by one or more UE(s), and transmitting an IE from a base station (e.g., gNB) to the one or more UE(s) to restrict the subsequent search and reporting by the UE to the specified number.

In a further aspect, a method of conducting Physical Cell ID (PCI) conflict resolution is disclosed. In one embodiment, the method includes obtaining one or more Public Land Mobile Network ID (PLMN ID) values via a PLMN-ID value within a measurement results reporting information element (IE).

These and other aspects shall become apparent when considered in light of the disclosure provided herein.

BRIEF DESCRIPTION OF THE DRAWINGS

FIGS. 3-7 © Copyright 2018-2019 Charter Communications Operating, LLC. All rights reserved. Other Figures © Copyright of their respective copyright holders.

DETAILED DESCRIPTION

Figure 1:
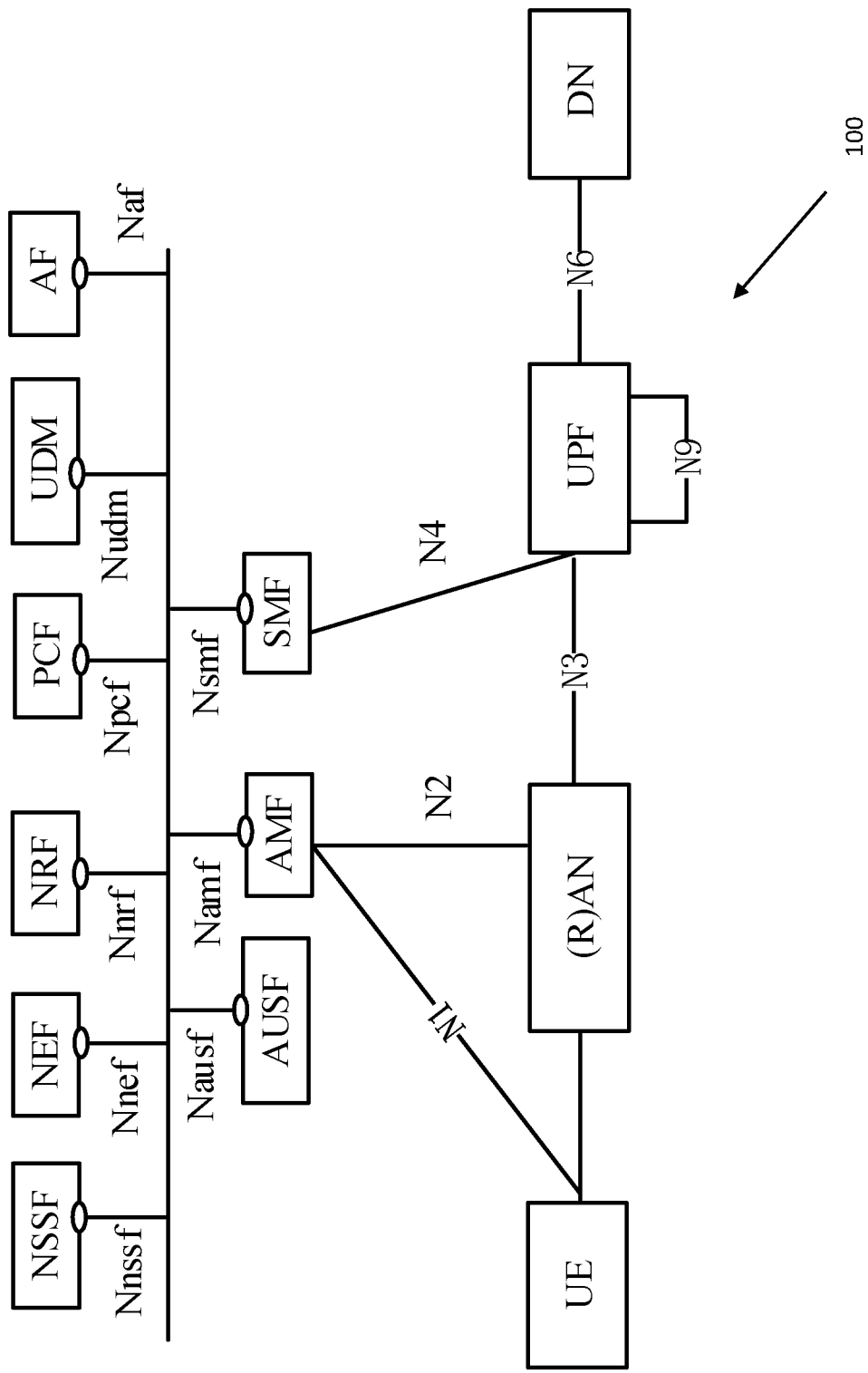
FIG. 1 is a functional block diagram of a prior art 5G system architecture and the various components thereof.
Figure 2A:
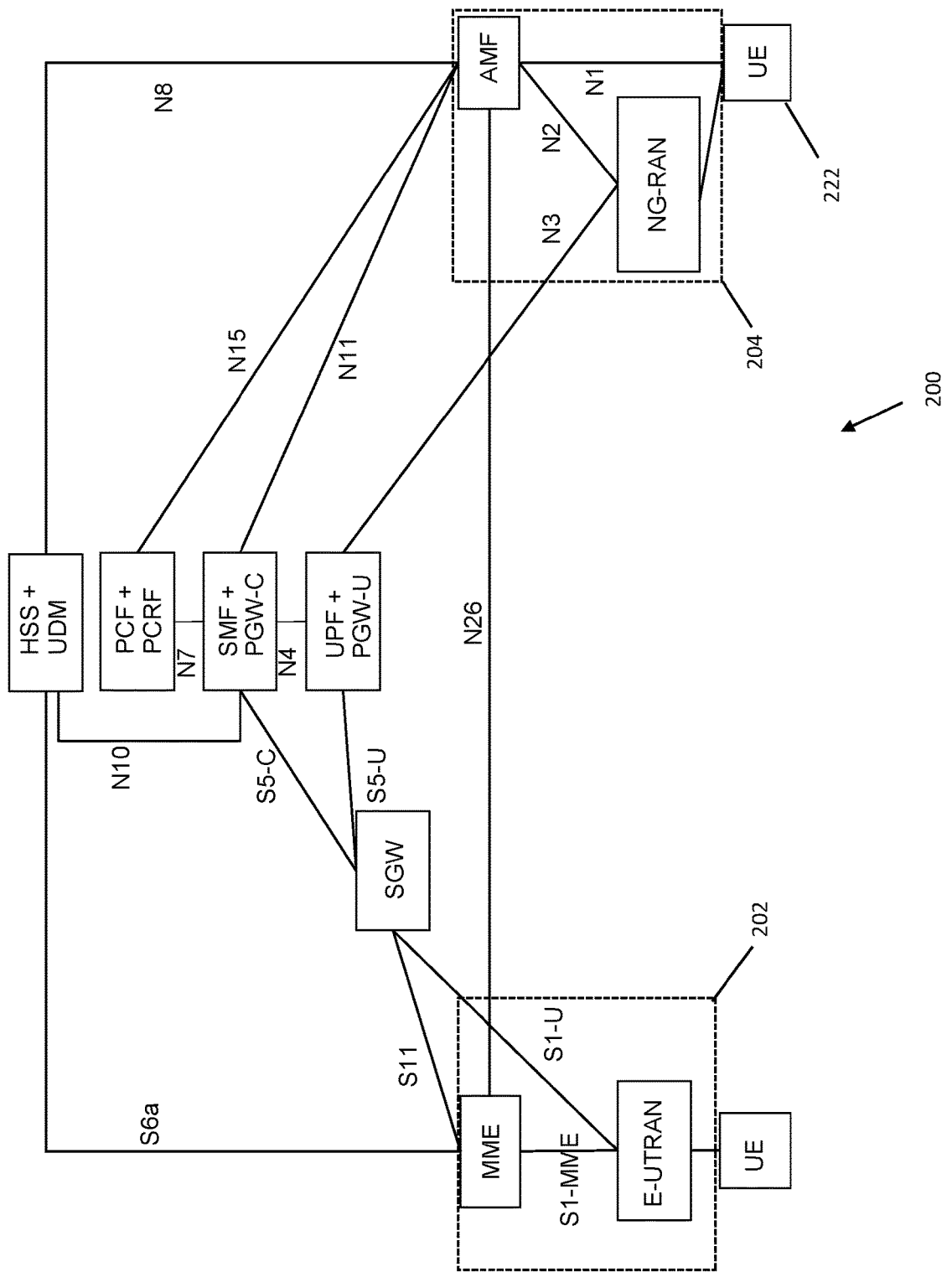
FIG. 2a is a block diagram showing the extant architecture for interworking between 5GS and EPC/E-UTRAN as defined in 3GPP TS 23.501 (FIG. 4.3.1-1 thereof), specifically the non-roaming architecture for interworking between the 5GS and the EPC/E-UTRAN.
Figure 2B:
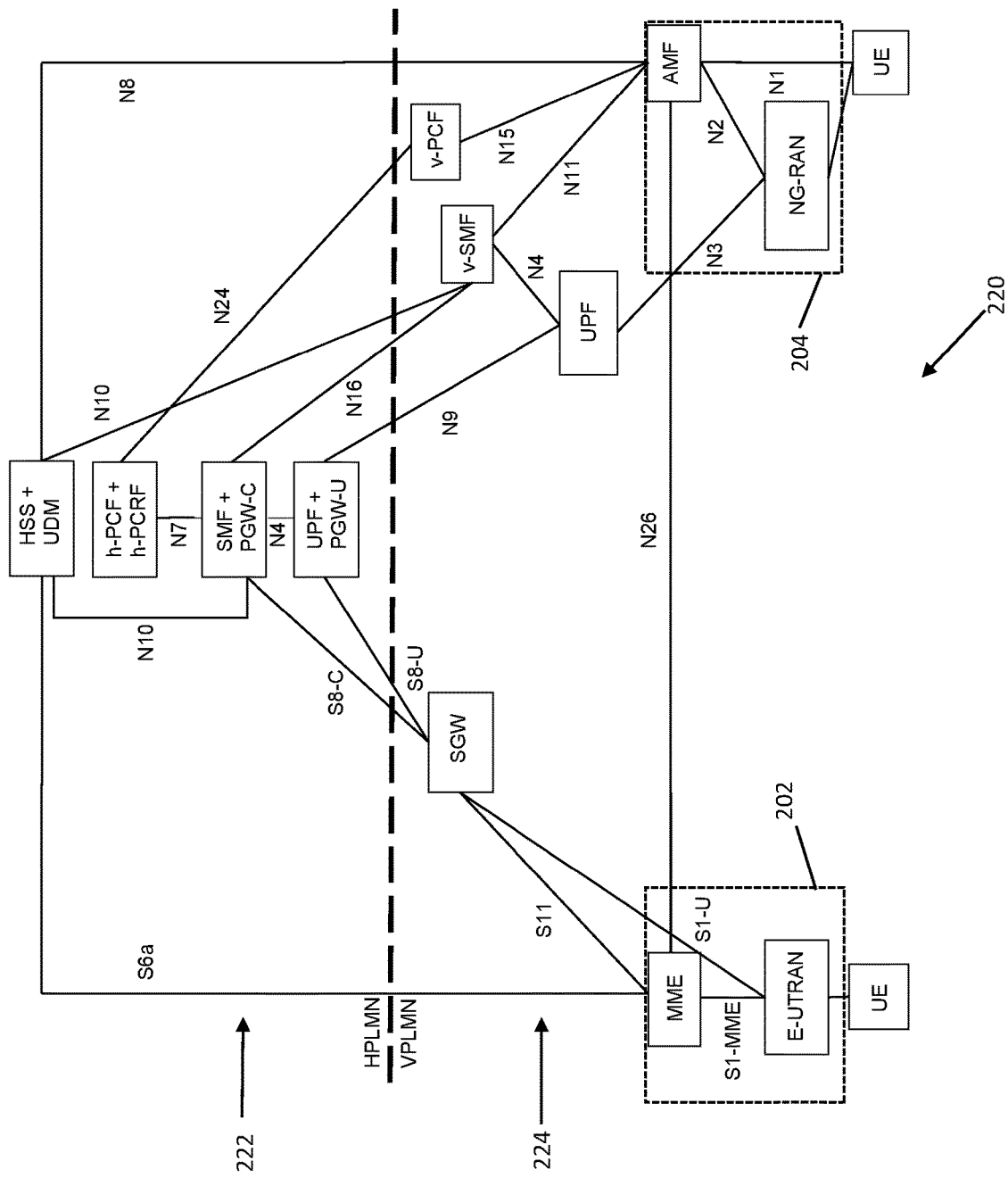
FIG. 2b shows a prior art roaming architecture counterpart to the architecture of FIG. 2a (i.e., with HPLMN and visited network (VPLMN)).
Figure 2C:
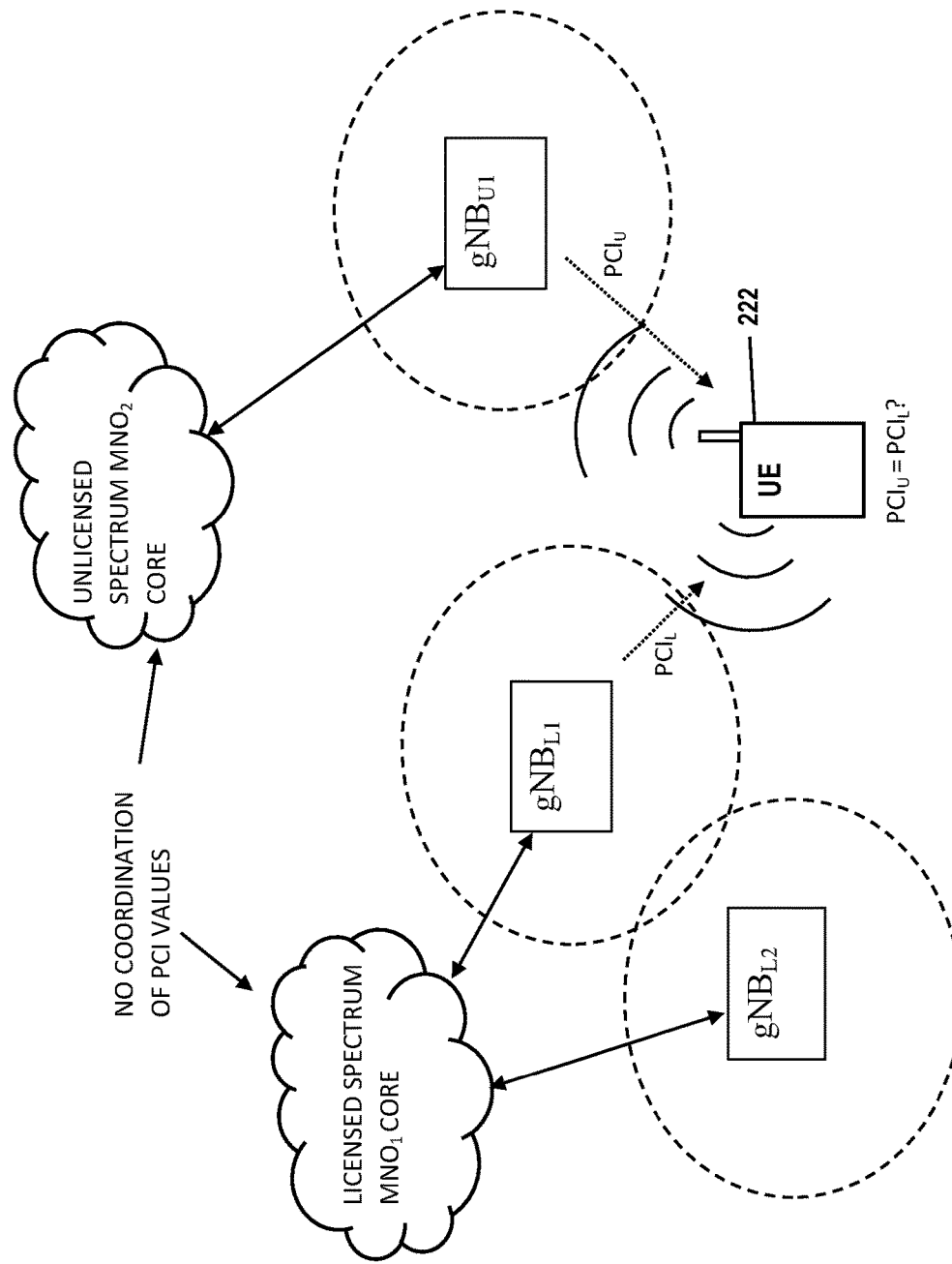
FIG. 2c shows a graphical representation of the PCI "confusion" problem between licensed and unlicensed spectrum networks within the exemplary 5G NR context.

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "central unit" or "CU" refers without limitation to a centralized logical node within a wireless network infrastructure. For example, a CU might be embodied as a 5G/NR gNB Central Unit (gNB-CU), which is a logical node hosting RRC, SDAP and PDCP protocols of the gNB or RRC and PDCP protocols of the en-gNB that controls the operation of one or more gNB-DUs, and which terminates the F1 interface connected with one or more DUs (e.g., gNB-DUs) defined below.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "distributed unit" or "DU" refers without limitation to a distributed logical node within a wireless network infrastructure. For example, a DU might be embodied as a 5G/NR gNB Distributed Unit (gNB-DU), which is a logical node hosting RLC, MAC and PHY layers of the gNB or en-gNB, and its operation is partly controlled by gNB-CU (referenced above). One gNB-DU supports one or multiple cells, yet a given cell is supported by only one gNB-DU. The gNB-DU terminates the F1 interface connected with the gNB-CU.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, VoLTE (Voice over LTE), and other wireless data standards.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications technologies or networking protocols (e.g., SONET, DOCSIS, IEEE Std. 802.3, ATM, X.25, Frame Relay, 3GPP, 3GPP2, LTE/LTE-A/LTE-U/LTE-LAA, 5GNR, WAP, SIP, UDP, FTP, RTP/RTCP, H.323, etc.).

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac/ax, 802.11-2012/2013 or 802.11-2016, as well as Wi-Fi Direct (including inter alia, the "Wi-Fi Peer-to-Peer (P2P) Specification", incorporated herein by reference in its entirety).

Overview

In one exemplary aspect, the present disclosure provides methods and apparatus for, inter alia, effectively resolving conflicts in PCI values which may exist within two or more mobile networks (e.g., PLMNs) of respective different operators when unlicensed spectrum is utilized.

In one implementation, this functionality is provided by specifying one or more mobility-related parameters associated with various UE, such that serving gNBs can determine whether a given UE requires a mobility context, and as such whether it should conduct subsequent RF measurement reporting to report back potential conflicts in PCI it may encounter to the gNB. In one variant, the measurement reporting is configured to comply with 5G NR-U required "listen-before-talk" or LBT protocols; i.e., to measure parameters consistent with the LBT protocols as part of the detection of any such PCI-based conflicts.

In another variant, a maximum number of PLMNs common to a given PCI is specified, such that instructed UE(s) will limit themselves to measurement reporting on that number of detected PLMNs.

Enhanced PCI confusion resolution capability as described herein advantageously allows for UE to utilize unlicensed spectrum (e.g., under the NR-U model) without complicated network communication and configuration requirements between two or more operating networks as typically found in licensed spectrum scenarios.

Moreover, the various aspects of the present disclosure can be implemented within the existing base of UE with no modification; i.e., each UE merely uses existing RF measurement reporting functions to provide the necessary data back to the serving gNB for PCI conflict resolution.

Similarly, only minor modifications to extant network-side architectures (e.g., 3GPP) are needed to support this enhanced functionality.

Detailed Description of Exemplary Embodiments

Exemplary embodiments of the apparatus and methods of the present disclosure are now described in detail. While these exemplary embodiments are described in the context of the previously mentioned wireless access networks (e.g., 5GS and ECS) associated with or supported at least in part by a managed network of a service provider (e.g., MSO and/or MNO networks), other types of radio access technologies ("RATs"), other types of networks and architectures that are configured to deliver digital data (e.g., text, images, games, software applications, video and/or audio) may be used consistent with the present disclosure. Such other networks or architectures may be broadband, narrowband, or otherwise, the following therefore being merely exemplary in nature.

It will also be appreciated that while described generally in the context of a network providing unlicensed spectrum service to a customer or consumer or end user or subscriber (i.e., within a prescribed service area, venue, or other type of premises), the present disclosure may be readily adapted to other types of environments including, e.g., outdoors, commercial/retail, or enterprise domain (e.g., businesses), or even governmental uses (including e.g., quasi-licensed spectrum such as CBRS). Yet other applications are possible.

Other features and advantages of the present disclosure will immediately be recognized by persons of ordinary skill in the art with reference to the attached drawings and detailed description of exemplary embodiments as given below.

Methods

Figure 3:
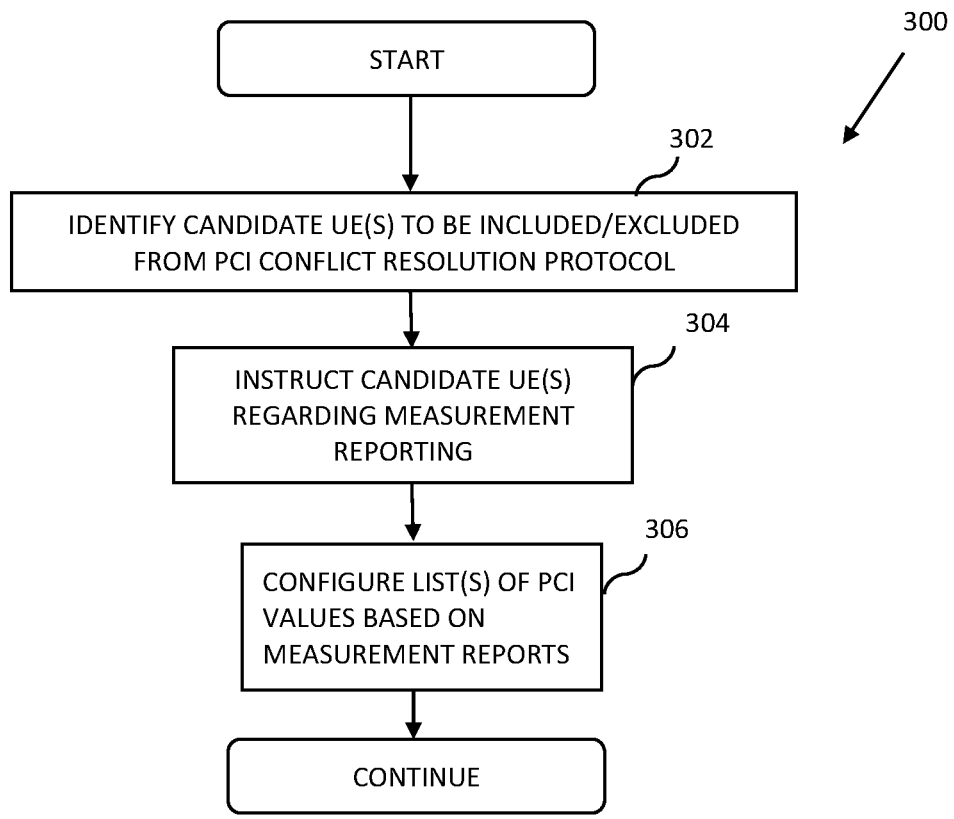
FIG. 3 is a logical flow diagram illustrating one embodiment of a generalized method of PCI conflict resolution according to the present disclosure.
Figure 3A:
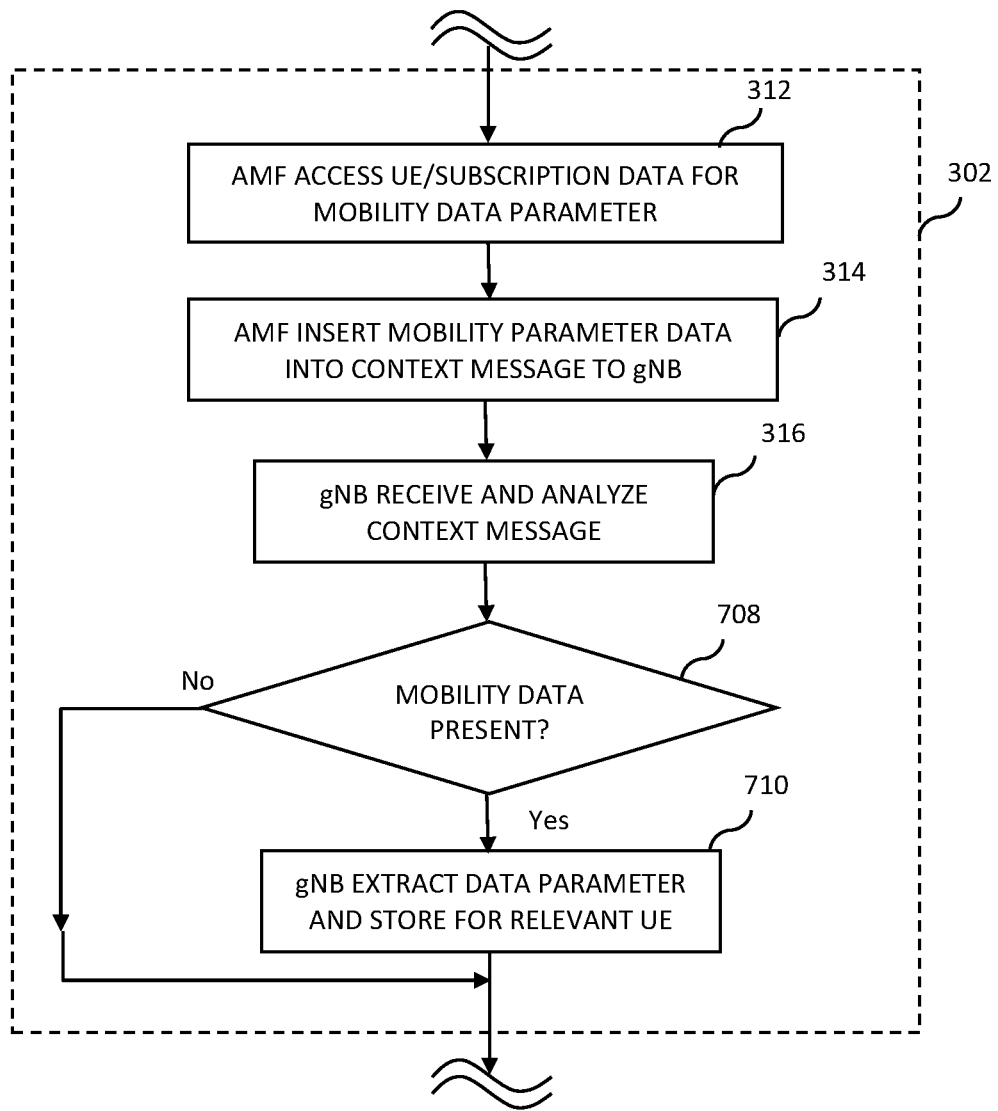
FIG. 3a is a logical flow diagram illustrating one embodiment of user device set identification within the generalized method of FIG. 3.
Figure 3B:
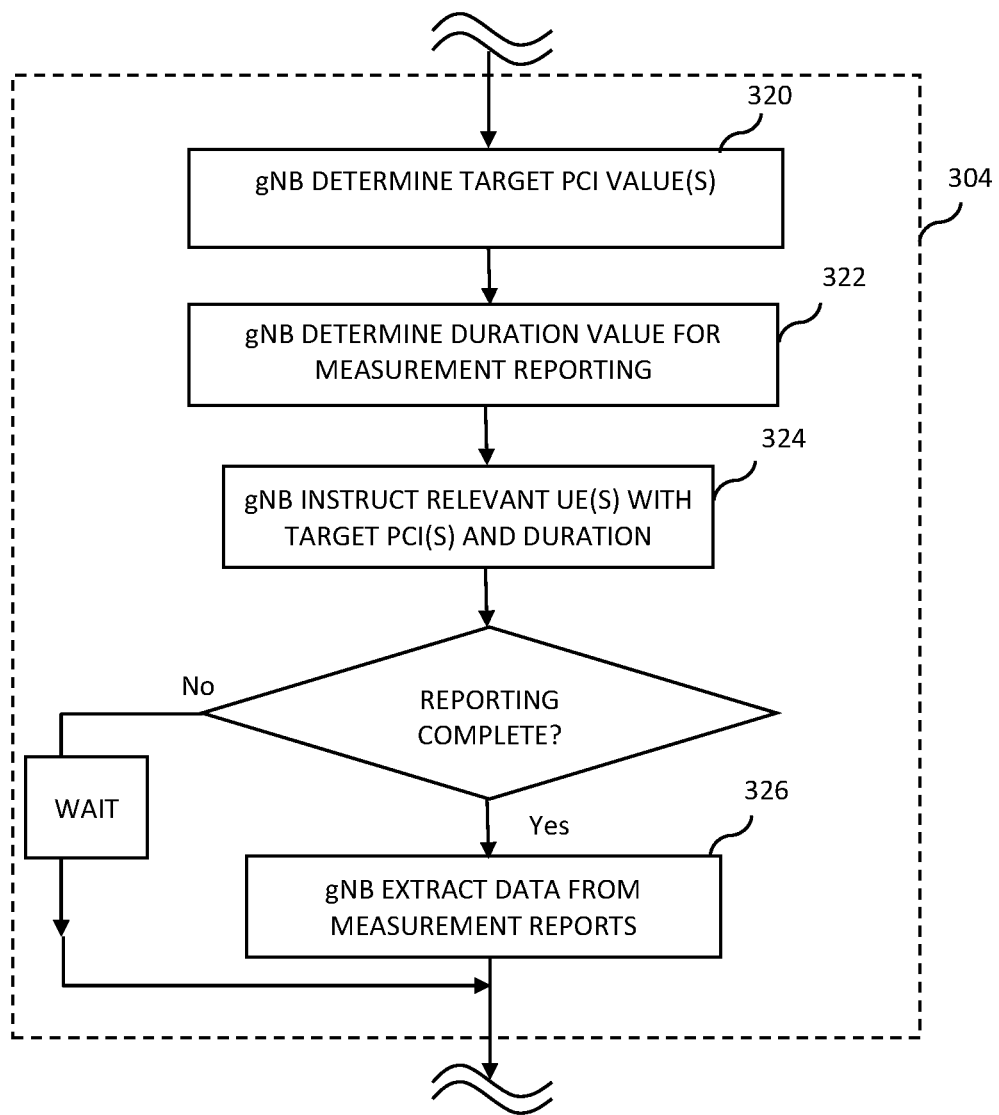
FIG. 3b is a logical flow diagram illustrating one embodiment of user device measurement reporting within the generalized method of FIG. 3.
Figure 3C:
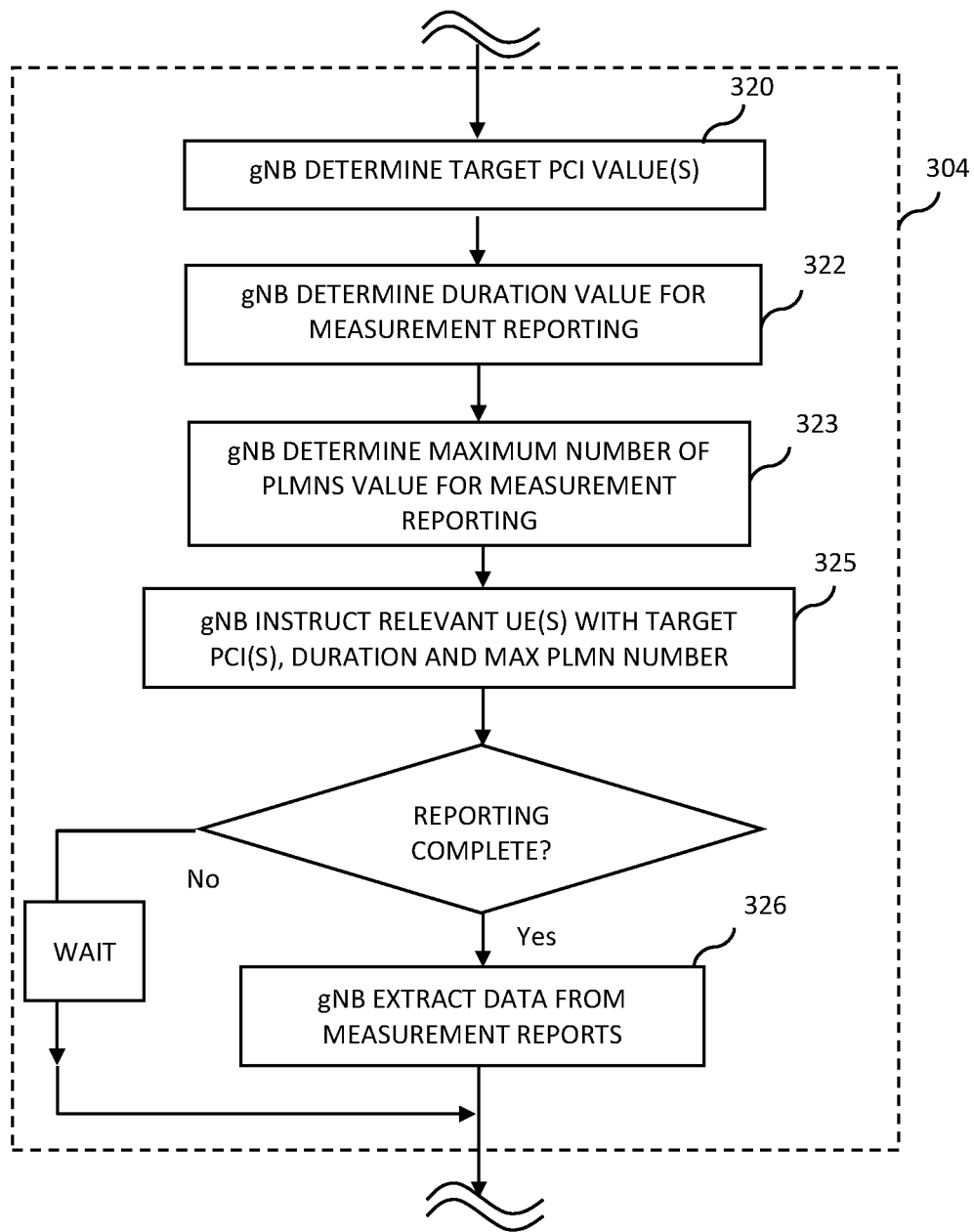
FIG. 3c is a logical flow diagram illustrating a second embodiment of user device measurement reporting within the generalized method of FIG. 3.

Referring now to FIGS. 3-3C, various embodiments of the methods of, inter alia, cell identification and operating a wireless network, are shown and described in detail. It will be appreciated that while these methods are described primarily in the context of a 3GPP-based (i.e., E-UTRAN and 5G NR) architecture, the various methods are in no way so limited, and may be readily adapted and applied to other types or configurations of wireless network such as for instance MulteFire™-based networks, such adaptation and application being within the skill level of the ordinary artisan given the present disclosure.

FIG. 3 shows a first embodiment of the generalized method for cell identification according to the present disclosure. Per step 302 of the method 300, one or more candidate UE(s) for PCI confusion resolution are identified. As described in greater detail below, in one implementation, this identification is accomplished based on a mobility-related factor or determination.

Next, per step 304, the cognizant gNB instructs the identified set of UEs from step 302 to perform Measurement Reports. As discussed below, in one implementation, the Measurement Reports are conducted taking the LBT (Listen Before Talk) protocol into account.

Lastly, per step 306, the gNB uses data from the Measurement Reports provided by the UE(s) to update the current white and/or black lists to include/exclude unrelated or improper PCI values.

Referring now to FIG. 3a, one particular implementation of step 302 of the method 300 is shown. Specifically, within step 302 of the method 300, a mobility-related determination is performed. Specifically, the gNB identifies at least some of the candidate set of UEs as requiring or not requiring application of the confusion resolution mechanism based on the presence or absence of a prescribed parameter (in one variant, the value "No Mobility Required" or NMR is used, although other values and forms of parameter may be used with equal success. Specifically, for certain UE(s) such as those used for Fixed Wireless Access (FWA), no mobility scenarios exist and hence such scenarios need not be supported. If a given gNB can identify such UE(s), then it can request the identified UE(s) to not perform Measurement Reports for certain PCI(s)).

In one approach, the presence or absence of this NMR or similar parameter is conducted when such UE(s)/users perform registration with the 5GC (see 3GPP TS 23.501, and 23.502); i.e., the "No Mobility Required" value is present in the N2-AP INITIAL CONTEXT SETUP REQUEST (which carries Registration Accept per TS 23.502 Section 4.2.2.2.2, step 21); see also TS 38.413 Section 8.3.1.2, step 2, each of the foregoing incorporated herein by reference in its entirety. Specifically, the AMF (Access and Mobility Management Function) may initiate the Initial Context Setup procedure if (i) a UE-associated logical NG-connection exists for the UE, or (ii) if the AMF has received the RAN UE NGAP ID IE in an INITIAL UE MESSAGE message, or (iii) if the NG-RAN node has already initiated a UE-associated logical NG-connection by sending an INITIAL UE MESSAGE message via another NG interface instance. The procedure uses UE-associated signalling.

Hence, per step 312 of the method of FIG. 3a, the AMF accesses the UE/subscription data for the relevant UE (e.g., by accessing the global DB 402 at the HSS+UDM entity 401 discussed below), and inserts this accessed data into the relevant context message (e.g., CONTEXT SETUP REQUEST) transmitted to the cognizant gNB (step 314).

To support the presence or absence of this NMR parameter within the above registration process, in one variant, each UE is characterized at time of generation of the UE(s) and/or users' subscription profile within the UDM (Unified Data Management) process or entity, the profile denoting "No Mobility Required" for that UE/user. For instance, an end-user may be utilizing a fixed 5G-enabled wireless device such as a smart TV, DSTB, gateway, router, IoT-enabled device, etc. which has no mobility capability.

As a brief aside, it will be recognized that as used herein, the term "mobility" refers more to intra-cell mobility, versus inter-cell mobility. Specially, any device is mobile to some degree; i.e., one can set up their smart TV or IoT device within their premises, and then later move it to another location within the same premises. However, under such scenarios, from a PCI perspective, the device is immobile. Notwithstanding, the present disclosure also contemplates use of two or more "grades" or levels of mobility characterization in one alternate embodiment; e.g., (i) No Mobility Required, (ii) Limited Mobility Required, and (iii) Full Mobility Required. Under such model, the gNB can apply different protocols to the different levels of mobility support needed; e.g., the method 300 above for NMR, another for LMR (e.g., a hybridization of the method of FIG. 3 and mobility-enabled approaches in scenarios where the UE or another gNB signals that it then requires mobility in that limited instance), and yet another for FMR scenarios.

It will also be appreciated that while the foregoing approach of accessing the UDM (e.g., via the AMF) as part of the Attach procedure (and generating the INITIAL CONTEXT SETUP REQUEST sent to the gNB with mobility-related data) is used to determine UE mobility status for purposes of PCI management, other approaches may be used consistent with the present disclosure. For example, in another variant, the UE itself supplies the NMR or other parameter, such as via another Attach procedure or setup message.

As yet another variant, the parameter(s) of interest (e.g., NMR) may be provided in RRC signaling between the UE and gNB, including in some cases coupling with a subscription-based solution (the latter which is advantageously reliable and operator-controllable) as described in greater detail below with respect to Appendix II. Referring again to FIG. 3a, the gNB, upon receiving the context message from the AMF (step 316), analyzes the message and extracts the NMR value if present, and stores the NMR value for the duration of the UE's session context (i.e., during RRC_CO- NNECTED and RRC INACTIVE states) per step 318. As described in greater detail below, the gNB may use the NMR data e.g., when deciding to request one or more UE(s) to perform Measurement Reporting, and correspondingly update white/black lists for Measurement Reporting if deemed necessary It will also be recognized that in other variants, the NMR or other mobility-related data may be used as a basis for inclusion as well as exclusion of UEs within the gNB identification logic. For example, if it is desired to identify UE(s) with no mobility requirements, then those carrying the NMR parameter (e.g., via the CONTEXT REQUEST from the AMF as described above) are included, and all else are excluded. Conversely, if it is desired to identify only UE(s) having mobility requirements, those carrying the NMR parameter are excluded, and all else included. It will be recognized that the "negative" of this approach can be used as well consistent with the present disclosure; i.e., all UE(s) not within a FWA or no-mobility context can have for instance an "MR" (Mobility Required) parameter, while all others have no such value. Likewise, in another variant, those UE(s) requiring mobility may carry the MR parameter, while those under FWA carry the NMR parameter. Since the number of FWA-context devices is expected to be much less than the mobility-required devices, it is more efficient to merely label the FWA-context devices with NMR or the like in such scenarios. In one implementation, UEs not supporting NMR functionality by definition will be considered normal UEs, although it will be recognized that they may also be affirmatively identified or labeled as not supporting parameter (e.g., NMR) functionality.

Referring now to FIG. 3*b*, one implementation of step 304 of the method 300 of FIG. 3 is described. Specifically, per step 320, the cognizant gNB determines at least one "target" PCI, as well as a duration value specifying the duration for which the requested measurement is to be performed (i.e., in order to sufficiently collect required NCGI data from all PLMNs broadcasting the same PCI for a given frequency) per step 322. As noted, for a given cell, a gNB supports many UEs. Based on those UEs' mobility state information already available the gNB (e.g., the NMR parameter), the gNB requests the identified sub-set of UEs to perform (or not perform, depending on the constitution of the sub-set as discussed supra) additional Measurement Reports to resolve PCI confusion. In one such approach, the gNB affirmatively instructs only those UE not having the NMR parameter associated to perform the Measurement Reports. In another approach, the gNB affirmatively instructs only those UE having the NMR parameter associated to not perform the Measurement Reports.

As a brief aside, unlicensed spectrum coexistence is a key principle in both LAA (LTE) and NR-U (5G). This coexistence is accomplished by dynamically selecting available channels within the unlicensed band to avoid e.g., Wi-Fi users. If no available or clear channel is present, channels are shared "fairly" among the users using the Listen Before Talk (LBT) protocol. As in LTE-LAA and other technologies, the LBT protocol in NR-U is a mechanism by which measurements of a given carrier are obtained, and use or "backoff" determined based on the measurements.

Accordingly, in one implementation, step 324 of FIG. 3*b* includes the following ASN.1 additions to the MeasObjectNR IE (information element which specifies information applicable for SS/PBCH block(s) intra/inter-frequency measurements or CSI-RS intra/inter-frequency measurements) to instruct the UE(s) on the requisite scan time (including flexibility to change as needed dynamically)—see Appendix I hereto:

```
measReportLBTScanTime     INTEGER
(XX..maxMeasRepPCIScanTime) OPTIONAL -- Time for which the UE
scans for all possible SSBs being broadcasted in the same PCI by different
PLMNs
   maxMeasRepPCIScanTime    INTEGER ::= YY
   (where YY is the Maximum time (in ms) for which a given PCI is
scanned)
```

As a brief aside, in 5G NR, the SSB (the Synchronization Signal/PBCH Block) consists of synchronization signal (i.e., PSS and SSS) and PBCH channels. The SSB burst set is re-transmitted every 5 ms, and within every SSB burst set the SSB is transmitted at a certain periodicity. Since SSB is unique to a gNB on a per-cell, per-beam basis, it is safe to assume that when the SSB is transmitted continuously over a physical medium (e.g., an RF frequency), within a 5 ms period, a UE looking for the SSB should be able to read it.

In that NR requires tight time synchronization between the gNB and UE, it is also safe to assume that multiple gNBs both within the same PLMN and across different PLMNs are coordinated to an accurate timing source (e.g., atomic clock). Hence, time deviation among the gNBs of different PLMNs is negligible.

In LTE-LAA, the maximum COT (channel occupancy time) following a successful LBT procedure is 10 ms (see TS 37.213 v15.1.0 clause 4.1.1, incorporated herein by reference in its entirety). One implementation of the methodology described herein, based on the assumption that an NR system uses the same 10 ms value, uses a 15 ms total (5 ms+10 ms) time for the UE to scan for all possible SSBs being broadcast in the same PCI, such as by different PLMNs. As such, the previously discussed ASN.1 additions to the MeasObjectNR IE in such implementations can be configured with values of XX and YY of 5 ms and 15 ms, respectively—that is:

```
measReportLBTScanTime       INTEGER
(5..maxMeasRepPCIScanTime)   OPTIONAL -- Need R
maxMeasRepPCIScanTime        INTEGER ::= 15
```

Hence, per step 324 of FIG. 3*b*, the gNB then provides the identified UE(s) from step 302 (FIG. 3) with the determined PCI and scan time values as above, which enables the UE to scan the PCI(s) and return the generated data as part of the Measurement Report procedure.

Per step 326, the gNB extracts the relevant reporting data for the target PCI values from the Measurement Reports of the "instructed" UE after such Reports have been received (e.g., signal strength data for the prescribed frequencies).

In another implementation (discussed below with respect to FIG. 3*c*), the gNB further instructs the UE(s) to implement a second parameter relating to a prescribed maximum number of PLMNs to report on.

Figure 3D:
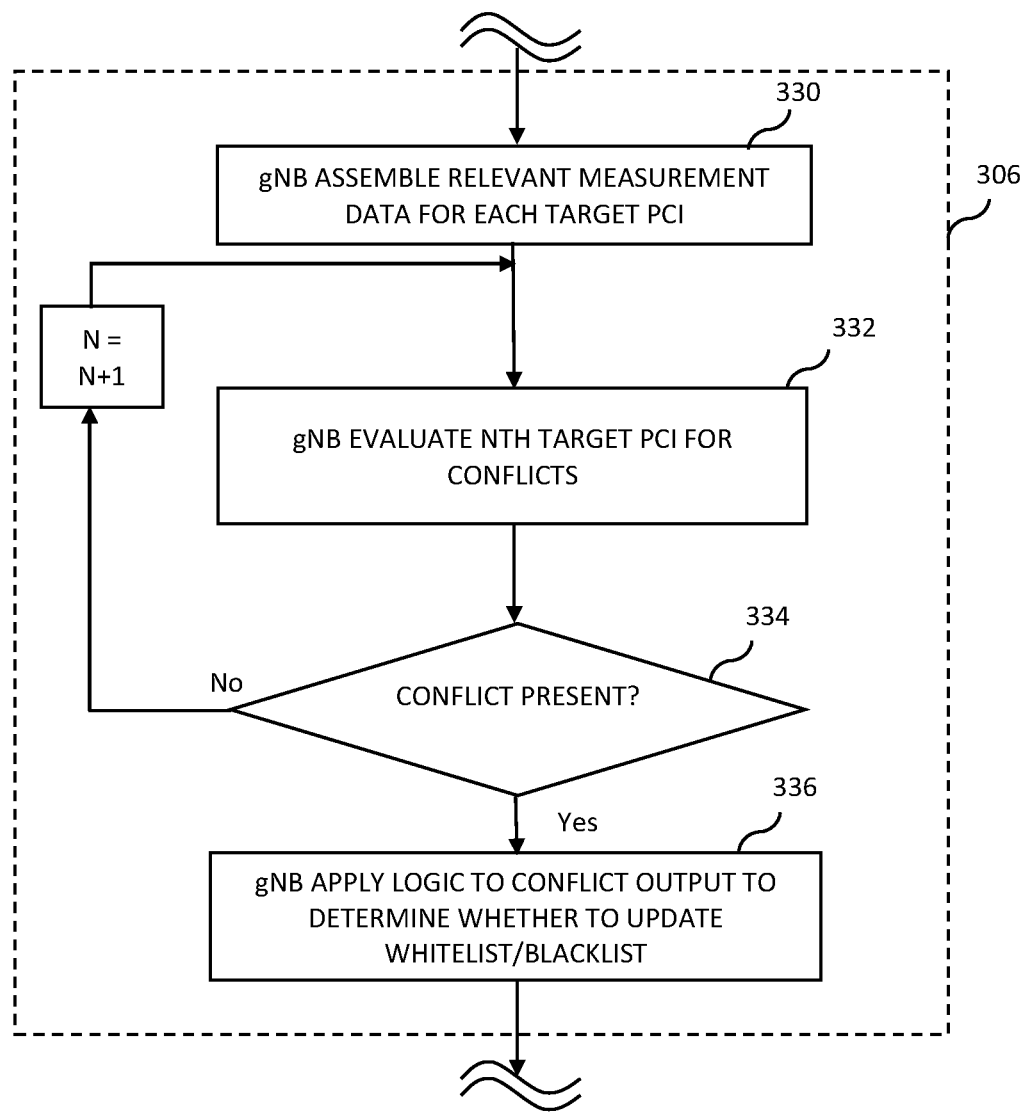
FIG. 3d is a logical flow diagram illustrating one embodiment of whitelist/blacklist updating based on measurement reporting, within the generalized method of FIG. 3.

Referring now to FIG. 3*d*, one implementation of the method step 306 of FIG. 3 is now described in detail. As shown, per step 330, the gNB assembles the extracted Measurement Report data from the directed UE(s) relating to all NCGI(s), in response to gNB's PCI to NCGI resolution request. In one variant, this is performed on a per-PCI basis, although other schemes may be utilized consistent with the present disclosure.

Per step 332, the gNB logic then evaluates the received data for each target PCI to determine whether conflicts are present. Per steps 334 and 336 the gNB can, based on various criteria including the results of the evaluation of step 332, decide to update the current white list and/or black list; i.e., specifying those PCI on which it wishes to subsequently obtain Measurement Reports.

Notably, extant white list/black list approaches only allow for the inclusion of PCI values (i.e., in the PCI-Range IE). The PCI-Range IE is defined in TS 38.331 and is used to encode either a single or a range of physical cell identities. Per TS 38.331, the range is encoded by using a start value and by indicating the number of consecutive physical cell identities (including start) in the range. For fields comprising multiple occurrences of PCI-Range, the Network may configure overlapping ranges of physical cell identities. The "range" field in the PCI-Range IE indicates the number of physical cell identities in the range (including start). For example, the value n4 corresponds with 4, n8 corresponds with 8. The UE applies a value of 1 in the case the field is absent, in which case only the physical cell identity value indicated by the "start" field applies. The "start" field indicates the lowest physical cell identity in the range.

In the particular case of PCI confusion, however, the extant structure is not sufficient. Specifically, what is required is the ability to either enable or disable Measurement Reports from PCI(s) of a specific PLMN. Therefore, the following modified ASN.1 PCI-Range IE is provided per one embodiment of the present disclosure to support such additional specificity:

IE, the UE-CapabilityRAT-ContainerList is used. The IE UE-CapabilityRAT-ContainerList contains a list of radio access technology specific capability containers. For NR, the IE UE NR-Capability IE is used to convey the NR UE Radio Access Capability Parameters, see TS 38.306. Appendix II hereto illustrates an exemplary implementation of the UE NR-Capability IE including added NMR parameters according to the present disclosure.

In another embodiment of the methodology (see FIG. 3c), the gNB may also utilize a second parameter to control the behavior of the UE conducting the measurement reporting. This second parameter, as described in greater detail below, may be used in tandem with (or even in place of in some circumstances) the previously described timing duration parameter(s).

Specifically, it is recognized by the inventors hereof that there is no reliable mechanism for knowing a priori how many PLMN operators will be operating within a given cell's area at any given point in time. During the initial deployment phase of NR technology, it is expected that the number of PLMN operators will be comparatively small and contained; however, as deployment continues over time, this assumption may no longer hold true. As discussed above, the ability of the gNB to utilize scan time limit(s) which may be applied to the PCI search and reporting is already provided herein. However, it may be the case e.g., that the use of the time-bounded limit may not be sufficient to adequately restrict the measurement reporting conducted by the UE; i.e., if a larger number of PLMNs are present (e.g., more than 5), they may all be within the prescribed scan window,

---

Modified PCI-Range Information Element

```
-- ASN1START
-- TAG-PCI-RANGE-START
PCI-Range ::=                    SEQUENCE {
    start                        PhysCellId,
    range                        ENUMERATED {n4, n8, n12, n16, n24, n32, n48, n64, n84,
                                     n96, n128, n168, n252, n504, n1008,spare1}     OPTIONAL --Need S
    nrCellId                     CellGlobalIdNR OPTIONAL -- PCIs of specific PLMNs for which
Measurements Reports are to be disabled
}
CellGlobalIdNR ::=               SEQUENCE {
    plmn-Identity                PLMN-Identity,
    cellIdentity                 CellIdentity
}
-- TAG-PCI-RANGE-STOP
-- ASN1STOP
```

---

As referenced above, in another variant, the parameter(s) of interest (e.g., NMR) may be provided in RRC signaling between the UE and gNB, including in some cases coupling with a subscription-based solution (the latter which is advantageously reliable and operator-controllable). For example, in one implementation, the UE provides the parameter(s) (e.g., NMR) within the UE NR-Capability IE, which is included in UECapabilityInformation message (the latter which is sent in response to UECapabilityInquiry message). As such, relevant portions of TS 38.331 may be modified as described below.

Specifically, upon reception of the foregoing data, the cognizant gNB has an understanding of whether a given UE can support the parametric determination (e.g., NMR) or not. Combined with the information received over the N2-AP INITIAL CONTEXT SETUP REQUEST as described elsewhere herein, the gNB can accurately decide whether or not to apply NMR for this UE. In one implementation, within the exemplary UECapability Information including in some cases being "densely packed" within a smaller portion of the scan window due to e.g., statistical variation, and hence the UE would still be conducting a higher number of scans/reports than desired, even with the scan window limit imposed.

As such, an additional mechanism by which the number of PLMNs corresponding to the PCI (and hence reports corresponding thereto generated by the UE(s)) may be limited is proposed herein; i.e., a "report-bound" in addition to the previously described "time-bound" on the PLMN search. Specifically, in one implementation, an addition to the ASN.1/TS 38.331 MeasObjectNR IE is used as shown below:

maxPLMNsPerPCIToReport    INTEGER::=(1..maxNrOfPLMNsPerPCIToReport)    OPTIONAL—Maximum number of PLMNs for the same PCI for Measurement reports are to be generated by the UE In one implementation, the constant maxNrOfPLMNsPerPCIToReport is defined as follows:

maxNrOfPLMNsPerPCIToReport INTEGER::=20

Appendices III and IV hereto illustrate various embodiments of the use of the above value within the ASN.1 MeasObjectNR IE.

Note also that in Appendix IV, the following elements have been added in place of the CellGlobalNR IE of the alternate embodiment:

| blackCellsToAddModList | BlockPCIOfCertainPLMNs |
| blackCellsToRemoveList | BlockPCIOfCertainPLMNs |

Note also that in Appendix IV, several new elements have been added, including e.g., the following:

| BlockPCIOfCertainPLMNs::= | SEQUENCE { |
| cellIdentity | CellIdentity |
| plmn-Identity | PLMN-Identity |

Referring again to FIG. 3c, the method proceeds similar to that of FIG. 3b described supra; however, at step 323, the further gNB determines the maximum number of PLMNs (e.g., 5 as in the example above) for which measurement reporting is to be conducted by the UE. This determined value may be on a global basis (i.e., all UE), or individual to one or more UE within the broader population.

Per step 325, the gNB instructs the relevant UE(s) with the target PCI value(s), duration(s), and also maximum PLMN number selected per step 323.

It will be appreciated that the exemplary specified constant value above (5) may be varied as needed, based on operational or other considerations. This variation may even be dynamic in nature, such as e.g., by logic having insight into the number of active PLMNs as a function of time (which may be correlated for example to status of operational deployment, planned maintenance outages, etc.). The value of the constant may also be related to the above-described scan time value(s), such as where it is desired to use the maxNrOfPLMNsPerPCIToReport parameter to limit the measurement reporting when a longer scan time window is used (i.e., when the window is so long as to effectively provide no limitation).

It will also be appreciated that the scan time parameter(s) and the maximum number of PLMN parameter may be used heterogeneously across different UE being served by a common gNB. For instance, it may be desirable in some cases to have one subset of the UE population implement the scan time parameter(s) alone, while others utilize the combination of scan time and maximum PLMN number parameters. Since RRC parameters are UE-specific, different UEs can be provided different values by the gNB given its knowledge of the topology, statistics, operational considerations, etc. These heterogeneous uses may also be combined with the conjunctive/selective use of the scan time and maximum PLMN numbers described herein to optimize the network on a per-UE/per-gNB basis. For example, even two UE's within the same subset may have differing combinations/constant values, such as in the case where Combination A (scan time parameter=R, maximum PLMN number=S) is applied to a portion of the second subset mentioned above (combination subset), while Combination B (scan time parameter=T, maximum PLMN number=U) is applied to another portion of that same second subset.

Further, as referenced above, the present disclosure contemplates use of individual ones of the parameters (e.g., scan time/maximum number of PLMNs) either individually or in combination, depending on factors such as operational circumstance. It will be appreciated that such different parameters may have respective different benefits/optimizations, thereby making their use non-identical. For instance, one risk or potential detriment of using the scan time parameter alone is that the cognizant gNB may not get an accurate representation of all possible combinations of PLMNs which a given UE is experiencing. This disability can be resolved by, for instance, the gNB performing cell scans itself, or performing ANR, but, neither of these "work arounds" is optimal.

Conversely, one risk or potential detriment in using the maximum PLMN number parameter alone is that as the number of PLMNs for a given PCI increases, the affected UE(s) will spend progressively longer times (and resources) scanning for all possible PLMNs (i.e., until the maximum specified number is reached).

Accordingly, in one exemplary implementation of the disclosure, a conjunction of both parameters may provide an optimal balance of UE power consumption obtaining the most accurate data regarding the UE's environment. It will be recognized, however, that such uses may be selectively invoked or adjusted; for instance, where UE electrical power consumption is low (e.g., where the battery charge is significantly depleted or below a prescribed threshold), this information may be used to "rebalance" the optimization, such as by e.g., reducing the maximin number of PLMNs specified in the constant maxNrOfPLMNsPerPCIToReport.

In yet another embodiment of the disclosure, rather than use of CGI reporting—e.g., cgi-Info IE in MeasResultNR (which may or may not be active based on circumstance; i.e., is optional, and CGI reporting may not be turned on), the PLMN-ID is reported when performing RSRQ/RSRP or other signal strength indicator (SSI) measurements, based on PCI reporting.

Specifically, as shown in the embodiment of Appendix III, the PLMN-ID may be added to MeasResultNR, so that the PLMN-ID can be obtained in cases where CGI reporting is not invoked. Alternatively, it can be obtained from the CGI-nfo IE where utilized.

Network Architecture

Figure 4:
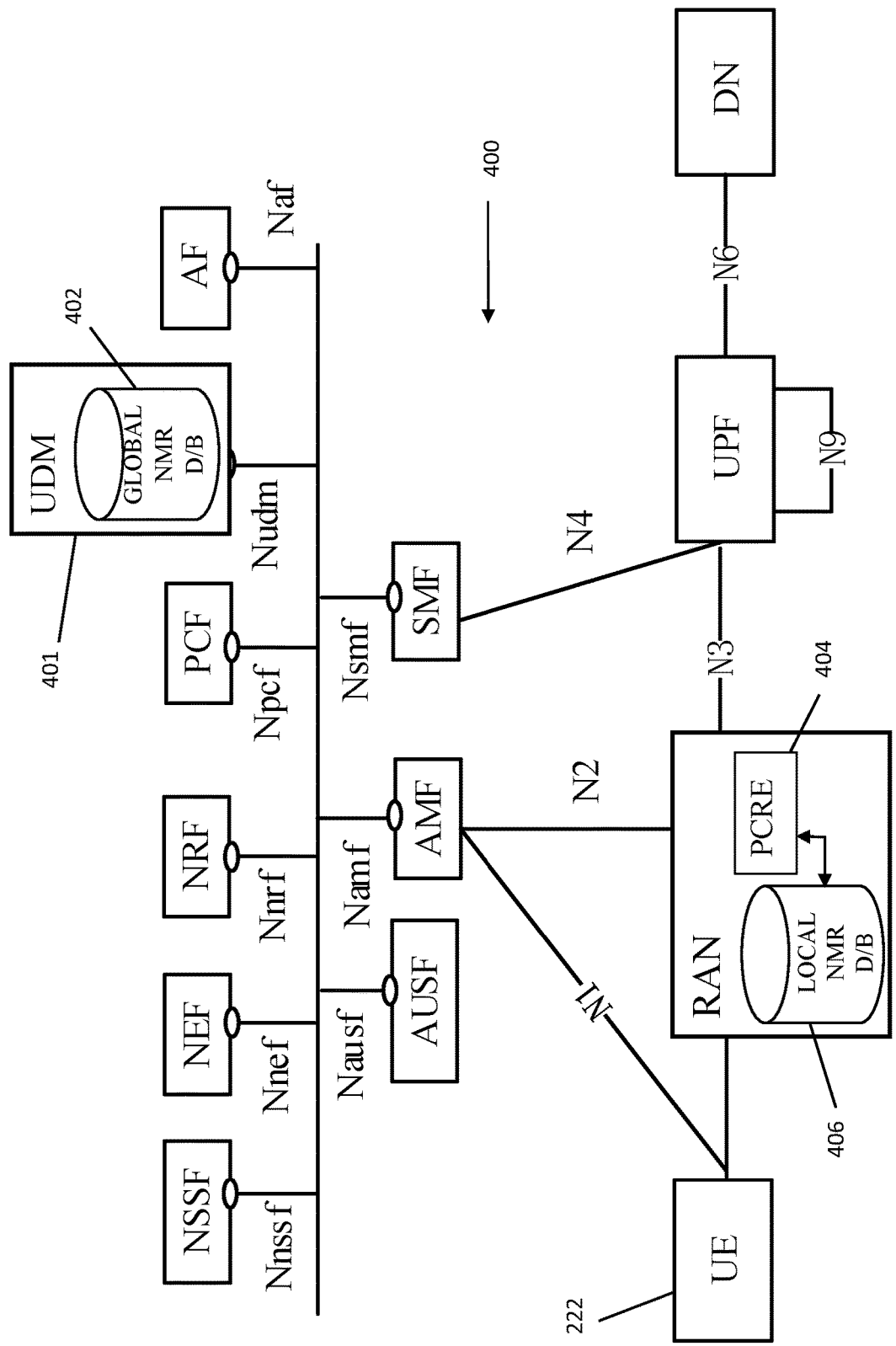
FIG. 4 is a functional block diagram of a first exemplary embodiment of an enhanced 5G NR network architecture according to the present disclosure.

FIG. 4 shows one embodiment of a 5G NR-based architecture 400, including aspects as defined in 3GPP TS 23.501, according to the present disclosure. Specifically, as shown, the architecture 400 includes a UDM-based data repository or database 402 of UE characterizing data (such as for instance the NMR and/or other parameters previously described) to be used consistent with the methods of FIGS. 3-3C. The architecture also includes a PCI Conflict Resolution Entity (PCRE) 404, as well as a local characterizing database 406 for all or a subset of the gNBs (within the NG-RAN). For example, in one scenario, all RAN (and their gNBs) include a PCRE 404 and database 406. In another scenario, only gNBs supporting particular unlicensed spectrum functionality include the PCRE/database. In yet another scenario, gNBs expected to have significant PCI conflicts (e.g., by virtue of having a large unlicensed footprint or presence nearby or overlapping within the RAN coverage area) include the PCRE/database. It will be appreciated that any number of deployment configurations and scenarios may be utilized consistent with the present disclosure, the architecture 400 of FIG. 4 being merely exemplary.

Figure 4A:
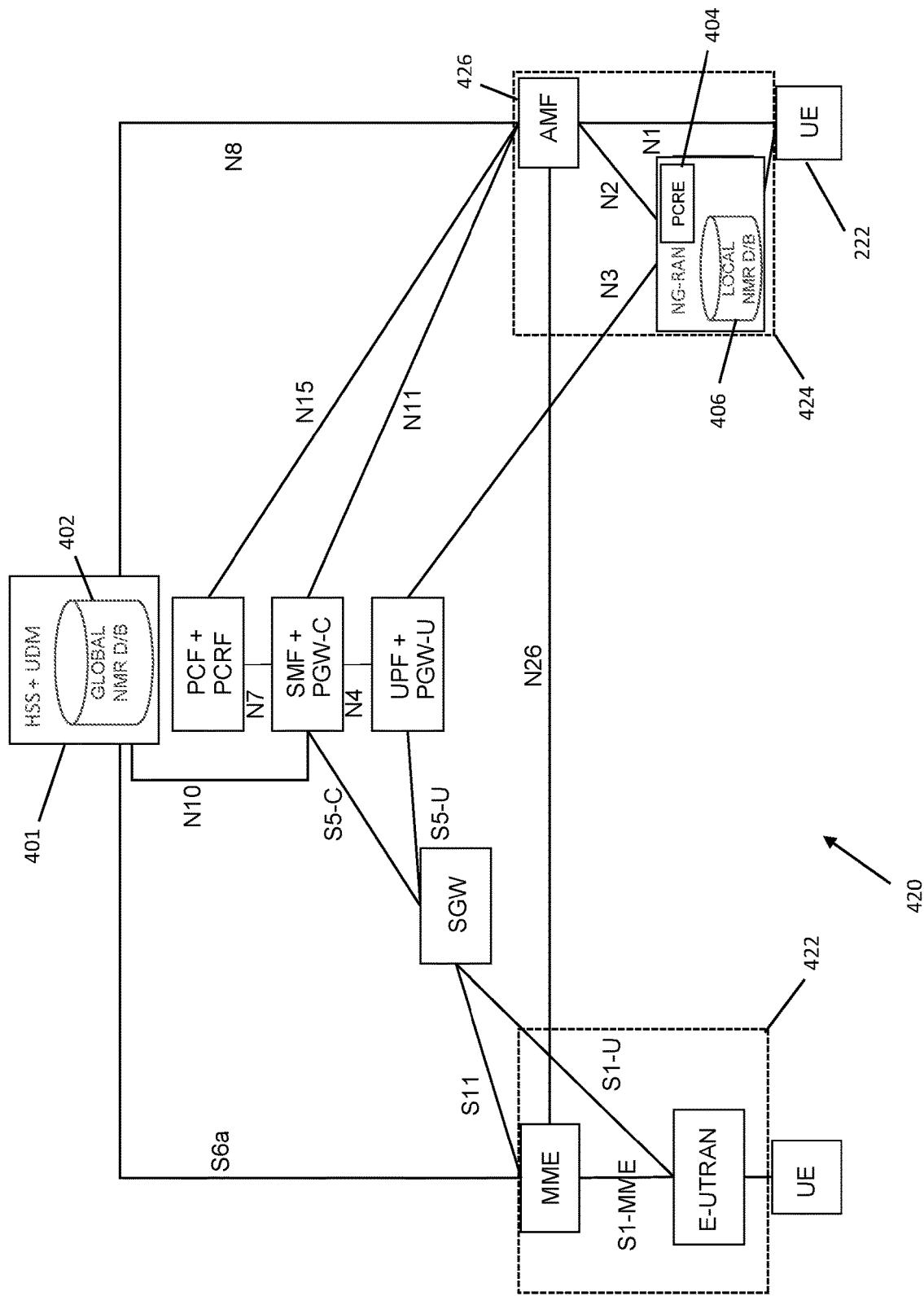
FIG. 4a is a functional block diagram of a first exemplary implementation of the architecture of FIG. 4 within a non-roaming E-UTRAN/5G network architecture according to the present disclosure.

FIG. 4a is a functional block diagram of a first exemplary embodiment of an enhanced E-UTRAN/5G network architecture according to the present disclosure. Specifically, as shown in FIG. 4a, the architecture 400 includes generally both a legacy or 4G/4.5G RAN 422 and a 5G-NR RAN (NG-RAN) 424, although it will be appreciated that configurations with different numbers of and/or other types of RANs may be utilized consistent with the present disclosure; e.g., a given PLMN may have multiple RANs including mixtures of legacy and next-generation technology, as well as unlicensed (e.g., ISM-band) and/or quasi-licensed (e.g., CBRS) apparatus and a capability associated therewith. In the illustrated embodiment, the PLMN represented within the diagram is the home PLMN (HPLMN) of the 5G NR-U enabled UE.

As shown, the 5G RAN 424 of the type described subsequently herein in detail is configured to include both a local parameter (e.g., NMR in this example) database 406, and PCRE 404. In this embodiment, the PCRE/NMR database are located within the 5G NR CU (central unit) of the relevant gNBs (not shown), although it will be appreciated that these components may be located in different locations, whether individually or collectively.

Also shown is the global NMR database 402, here logically disposed within the HSS+UDM functionality of the 5GC. The N8 interface as shown enables communication between the UDM process (and hence the global DB 402) and the serving AMF 426 in support of the PCI confusion resolution functions described herein.

Figure 4B:
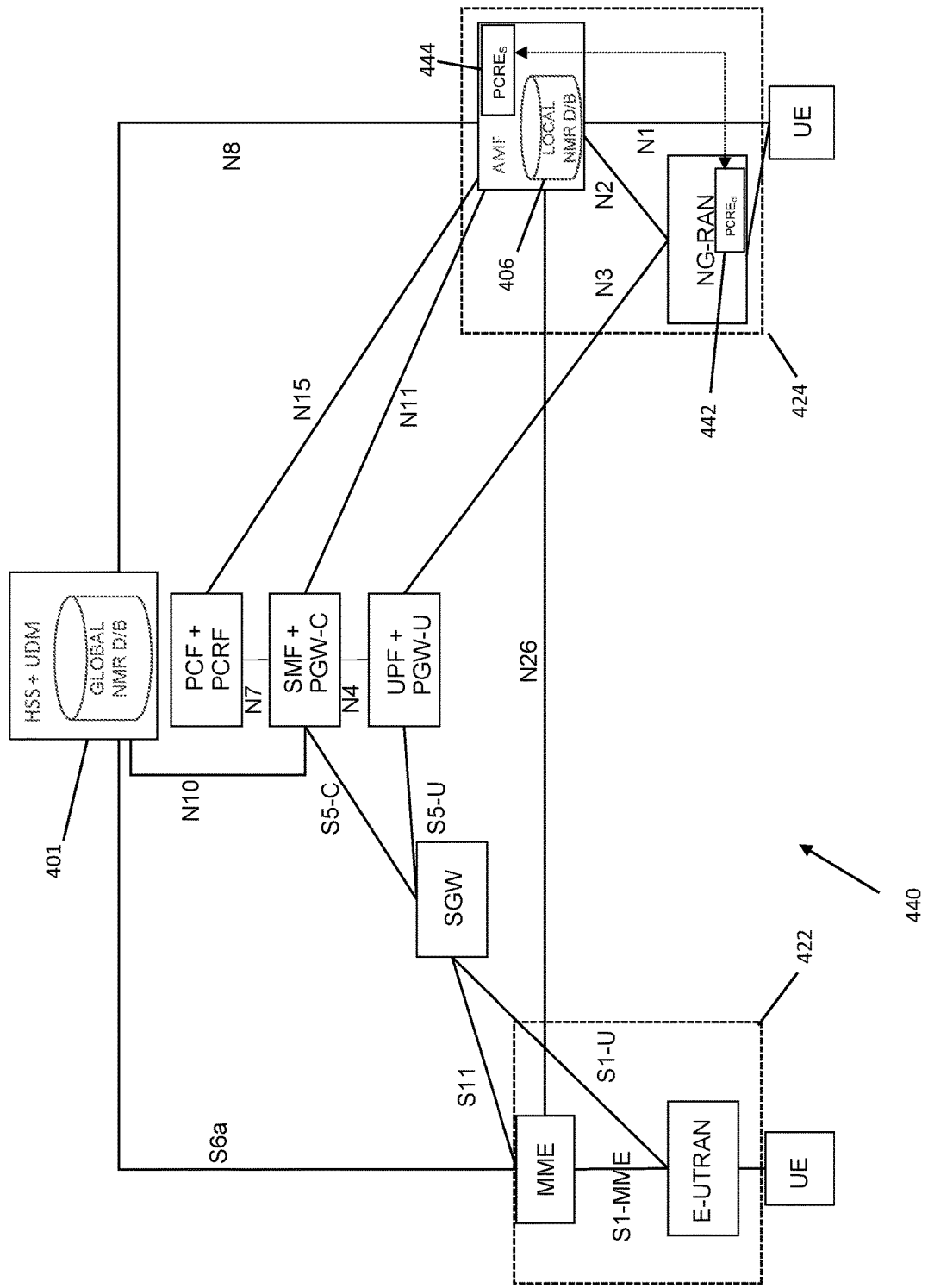
FIG. 4b is a functional block diagram of a second exemplary implementation of the architecture of FIG. 4 within a non-roaming E-UTRAN/5G network architecture according to the present disclosure.

In the architecture 440 of FIG. 4b, the PCRE 404 and local NMR database 406 are disposed logically within the AMF function 446, and hence multiple CU/DU (gNBs) can be provided with the PCI conflict resolution function more centrally as opposed to the configuration of FIG. 4a. In order for each gNB to receive and process the NMR data, a client or local portion of the PCRE (PCRE$_{cl}$) 442 and server portion (PCRE$_s$) 444 are used, with the PCRE$_s$ performing the evaluation and determination logic of e.g., FIGS. 3-3c, and the PCRE$_{cl}$ merely acting as an "implementation minion" process to in effect configure various UE with which it is in contact for Measurement Reporting (or no such reporting) as required.

Figure 4C:
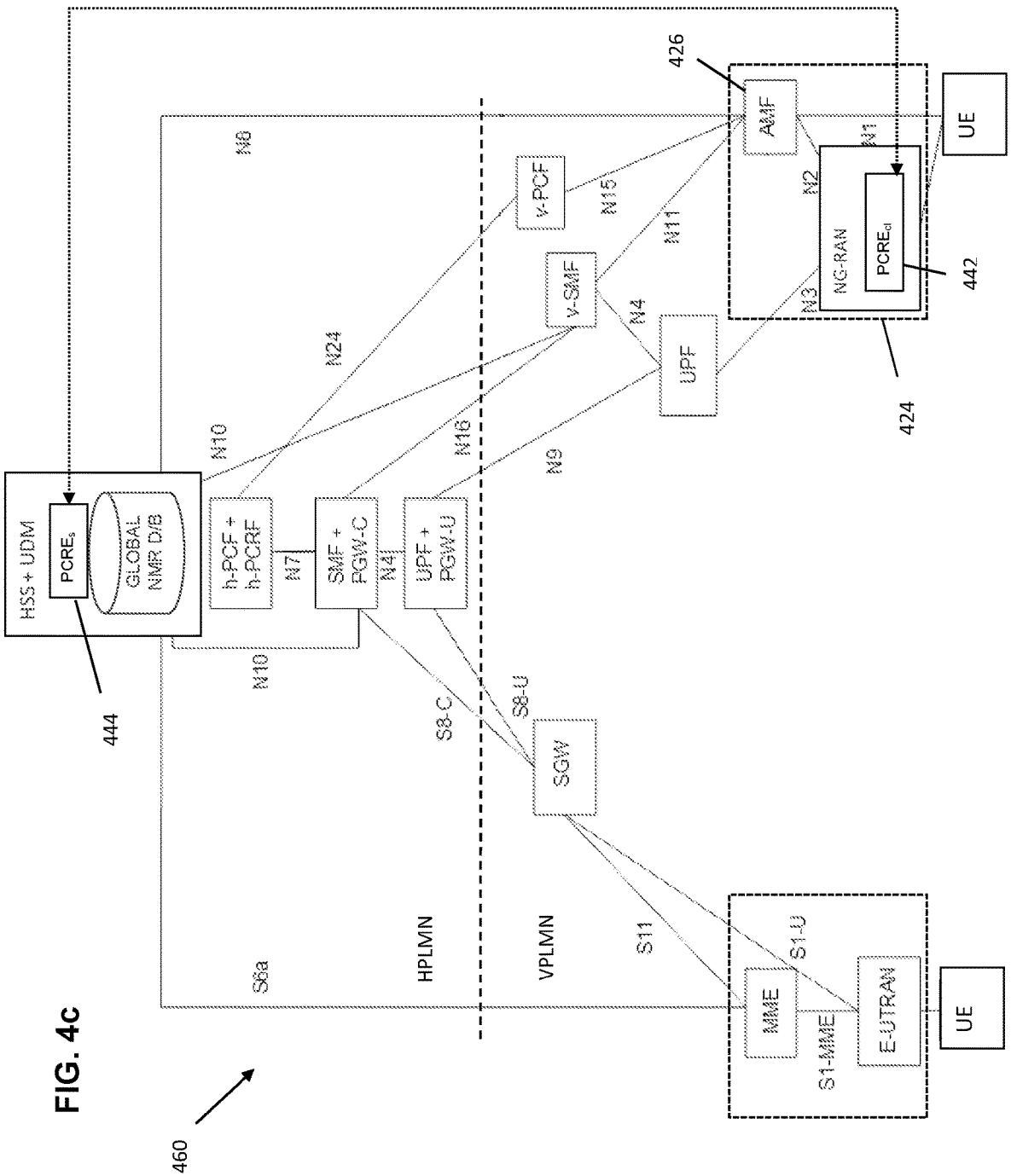
FIG. 4c is a functional block diagram of a first exemplary implementation of the architecture of FIG. 4 within a roaming E-UTRAN/5G network architecture according to the present disclosure.

In the architecture 460 of FIG. 4c, the PCRE$_s$ 444 is disposed within HSS+UDM of the UE's home PLMN, while the client (PCRE$_{cl}$) 442 is disposed within the visited PLMN (i.e., within the CU/DU of the NG-RAN gNB(s)). The local NMR DB 406 is obviated in favor of a single global DB 402 at the HSS+UDM.

As discussed with respect to FIGS. 5a and 5b below, depending on the division of ownership/operational responsibility between the NR (licensed) and NR-U (unlicensed) infrastructure, various combinations of component placement and configuration are possible in supporting the PCI conflict resolution functionality. For instance, in one variant, an MSO (e.g., cable or satellite network operator) may maintain NG-RAN functionality within their service domain (such as via their own deployed "standalone" or SA 5G NR-U enabled gNBs, as well as other unlicensed and/or quasi-licensed devices such as Wi-Fi APs, CBRS CBSDs, etc., with which the NR-U functionality must co-exist. Alternatively, in another variant, the MNO (e.g., cellular service provider) may maintain all infrastructure (including the PCI conflict resolution enabled gNBs and the various NMR databases), and merely lease or otherwise enable customers of the MSO to access the MNO infrastructure.

As such, the placement and configuration of the various PCI conflict resolution processes (i.e., PCREs, NMR databases, etc.) is envisioned to vary accordingly. Advantageously, since standardized 5G NR protocols and interfaces are utilized, communication between the various entities is straightforward (i.e., as opposed to proprietary protocols utilized in each domain).

Service Provider Network

Figure 5A:
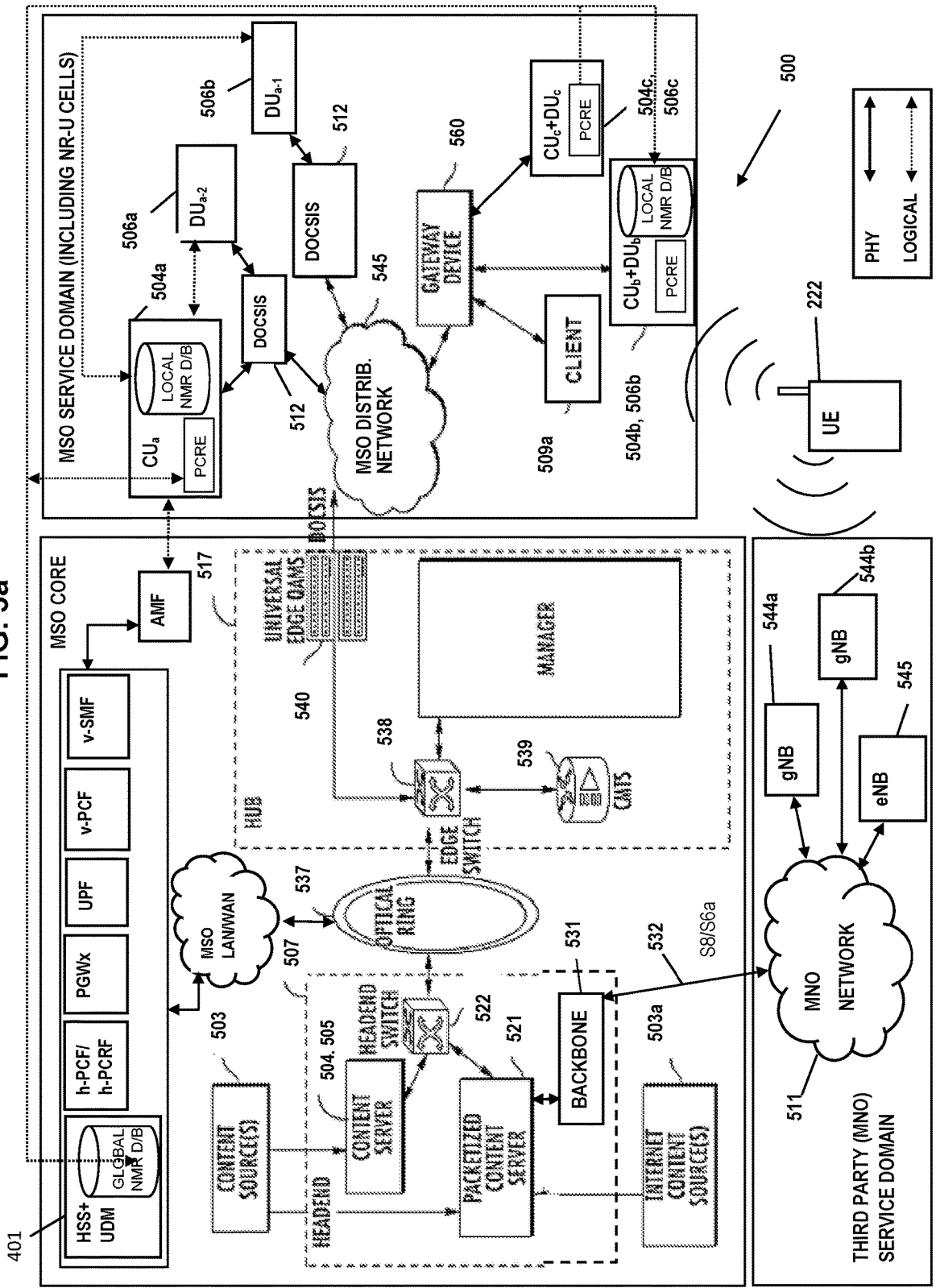
FIG. 5a is a functional block diagram of a first exemplary MSO/MNO network architecture useful in conjunction with various features described herein, wherein the MSO maintains the majority of 5G NR core infrastructure.

FIG. 5a illustrates a typical service provider network configuration useful with the features of the enhanced PCI conflict resolution apparatus and methods described herein, including the enhanced 3GPP architectures of FIGS. 4-4c. This service provider network 500 is used in one embodiment of the disclosure to provide backbone and backhaul from the service provider's service nodes, such as HFC cable or FTTC/FTTH drops to different premises or venues/residences. For example, one or more stand-alone or embedded DOCSIS cable modems (CMs) 512 are in data communication with the various NR (5G) architecture components (e.g., DU's and CU's) so as to provide two-way data communication to the served components.

Also provided within the architecture 500 of FIG. 5 is an MSO interface 532 to one or more MNO networks 511, such as those of an MVNO. The exemplary MNO/MVNO infrastructure or domain includes a number of 3GPP gNBs 544a-b and eNBs as shown, thereby providing 3GPP 4G/4.5G/5G coverage to authorized users of the MNO/MNVO network. These components (and others needed to support the E-UTRAN and 5G RAN in the architecture of e.g., FIG. 4a, such as the SGW and MME/MME$_e$—not shown in FIG. 5) interface with the MSO-domain (and ultimately the HSS+UDM with global NMR DB) via e.g., a data interface 550 to the MSO backbone 531. In one embodiment, this interface 532 supports the S5/S8/S6a 3GPP interfaces between the S-GW and P-GW (S8 is used when roaming between different operators, while S5 is network-internal).

The UE may include two radio transceivers (one for 3GPP LTE, and one for 3GPP NR including NR-U), or alternatively a common unified dual-mode transceiver, as well as protocol stacks serving the respective transceivers for functions including support of higher layer processes such as authentication.

Also included in the infrastructure 500 of FIG. 5a are the HSS+UDM with global NMR DB 402, PGW, h-PCF/h-PCRF, AMF 426, v-PCF, v-SMF, and UPF entities of FIGS. 4-4c. While these entities are shown as part of the MSO "core" infrastructure portion in this embodiment, it will be appreciated as previously discussed that such entities each (i) may be distributed at two or more different/other locations within the MSO core or service domain(s); (ii) may be combined with each other or with other MSO infrastructure components (including those at the service domain), and (iii) may be virtualized as software/firmware processes within other components (such as MSO system servers, RAN infrastructure, etc.). Hence, the illustrated configuration of FIG. 5a is merely illustrative in this regard.

Moreover, it will be recognized that while the architecture 500 of FIG. 5a is characterized in the context of the embodiment of FIG. 4a (i.e., with the PCRE functionality logically and functionally contained within the gNBs of the MSO service domain, the architecture 500 may readily be adapted by those of ordinary skill given the present disclosure for other embodiments, including for example those of FIGS. 4b and 4c.

In certain embodiments, the service provider network architecture 500 also advantageously permits the aggregation and/or analysis of subscriber- or account-specific data (including inter alia, particular CU or DU or E-UTRAN eNB/femtocell devices associated with such subscriber or accounts, as well as their mobility or FWA status as previously discussed) as part of the provision of services to users under the exemplary delivery models described herein. As but one example, device-specific IDs (e.g., gNB ID, Global gNB Identifier, NCGI, MAC address or the like) can be cross-correlated to MSO subscriber data maintained at e.g., the network head end(s) 507, or within the HSS+UDM (and associated global NMR database 402) where maintained by the MNO, so as to permit or at least facilitate, among other things, PCI conflict resolution and Measurement Report configuration.

As a brief aside, a number of additional identifiers over and above the PCI discussed supra are used in the NG-RAN architecture, including those of UE's and for other network entities. Specifically:

the AMF Identifier (AMF ID) is used to identify an AMF (Access and Mobility Management Function 426 shown in FIGS. 4-4c);

the NR Cell Global Identifier (NCGI), is used to identify NR cells globally, and is constructed from the PLMN identity to which the cell belongs, and the NR Cell Identity (NCI) of the cell;

the gNB Identifier (gNB ID) is used to identify gNBs within a PLMN, and is contained within the NCI of its cells;

the Global gNB ID, which is used to identify gNBs globally, and is constructed from the PLMN identity to which the gNB belongs, and the gNB ID;

the Tracking Area identity (TAI), which is used to identify tracking areas, and is constructed from the PLMN identity to which the tracking area belongs, and the TAC (Tracking Area Code) of the Tracking Area; and the Single Network Slice Selection Assistance information (S-NSSAI), which is used to identify a network slice. Hence, depending on what data is useful to the MSO or its customers, various portions of the foregoing can be associated and stored to particular gNB "clients" or their components being backhauled by the MSO network.

The MSO network architecture 500 of FIG. 5a is particularly useful for the delivery of packetized content (e.g., encoded digital content carried within a packet or frame structure or protocol, such as video, audio, or voice data) consistent with the various aspects of the present disclosure. In addition to on-demand and broadcast content (e.g., live video programming), the system of FIG. 5 may deliver Internet data and OTT (over-the-top) services to the end users (including those of the DU's 506a-c) via the Internet protocol (IP) and TCP (i.e., over the 5G radio bearer), although other protocols and transport mechanisms of the type well known in the digital communication art may be substituted.

The network architecture 500 of FIG. 5a generally includes one or more headends 507 in communication with at least one hub 517 via an optical ring 537. The distribution hub 517 is able to provide content to various "client" devices 509a, 506a-c, and gateway devices 560 as applicable, via an interposed network infrastructure 545. It will be appreciated from examination of FIG. 5a that the various gNB components (including the NR DU's and CU's and their constituent UE_e's) may each act as a "client" device of the network. For example, in many installations, the CU 504 of a given gNB is physically disparate or removed from the locations of its constituent DU's 506, and hence an interposed (e.g., wired, wireless, optical) PHY bearer is needed to communicate data between the DU's and CU of a given gNB. In one such architecture, the CU may be placed further toward the core of the MSO distribution network, while the various constituent DU's are placed at the edge. Alternatively, both devices may be near the edge (and e.g., served by edge QAMs or RF carriers 540 as shown in FIG. 5a). In both cases, the MSO infrastructure may be used to "backhaul" data from each device and communicate it to, via the MSO infrastructure, the other components, much as two geographically disparate customers of a given MSO might communicate data via their respective DOCSIS modems in their premises. Each component has an IP address within the network, and as such can be accessed (subject to the limitations of the architecture) by the other components.

Alternatively, the CU's (which in effect aggregate the traffic from the various constituent DU's towards the NG Core), may have a dedicated high bandwidth "drop."

Moreover, a given CU and DU may be co-located as desired, as shown by the combined units 504b and 504c, and 506b and 506c in FIG. 5a. This may also be "hybridized," such as where one constituent DU is co-located (and potentially physically integrated) with the CU, while the remaining DU of that CU are geographically and physically distributed.

In the MSO network 500 of FIG. 5a, various content sources 503, 503a are used to provide content to content servers 504, 505 and origin servers 521. For example, content may be received from a local, regional, or network content library as discussed in co-owned U.S. Pat. No. 8,997,136 entitled "APPARATUS AND METHODS FOR PACKETIZED CONTENT DELIVERY OVER A BAND-WIDTH-EFFICIENT NETWORK", which is incorporated herein by reference in its entirety. Alternatively, content may be received from linear analog or digital feeds, as well as third party content sources. Internet content sources 503a (such as e.g., a web server) provide Internet content to a packetized content origin server(s) 521. Other IP content may also be received at the origin server(s) 521, such as voice over IP (VoIP) and/or IPTV content. Content may also be received from subscriber and non-subscriber devices (e.g., a PC or smartphone-originated user made video).

The network architecture 500 of FIG. 5a may further include a legacy multiplexer/encrypter/modulator (MEM; not shown). In the present context, the content server 504 and packetized content server 521 may be coupled via a LAN to a headend switching device 522 such as an 802.3z Gigabit Ethernet (or "10G") device. For downstream delivery via the MSO infrastructure (i.e., QAMs), video and audio content is multiplexed at the headend 507 and transmitted to the edge switch device 538 (which may also comprise an 802.3z Gigabit Ethernet device) via the optical ring 537.

In one implementation, the CMs 512 shown in FIG. 5a each service a premises or venue, such as a conference center or hospitality structure (e.g., hotel), which includes one or more DU nodes for provision of 5G NR services, and may also service WLAN (e.g., 802.11-2016 compliant Wi-Fi) nodes for WLAN access (e.g., within 2.4 GHz ISM band), or even E-UTRAN femtocells, CBRS (Citizens Broadband Radio Service) nodes, or other such devices.

In parallel with (or in place of) the foregoing delivery mechanisms, the MSO backbone 531 and other network components can be used to deliver packetized content to the "client" gNB devices 504, 506 via non-MSO networks. For example, so-called "OTT" content (whether tightly coupled or otherwise) can be ingested, stored within the MSO's network infrastructure, and delivered to the gNB CU 504 via an interposed service provider network (which may include a public Internet) 511 (e.g., at a local coffee shop, via a DU connected to the coffee shop's service provider via a modem, with the user's IP-enabled end-user device utilizing an Internet browser or MSO/third-party app to stream content according to an HTTP-based approach over the MSO backbone 531 to the third party network to the service provider modem (or optical demodulator) to the DU, and to the user device via the DU NR wireless interface.

It will further be recognized that user-plane data/traffic may also be routed and delivered apart from the CU. In one implementation (described above), the CU hosts both the RRC (control-plane) and PDCP (user-plane); however, as but one alternate embodiment, a so-called "dis-aggregated" CU may be utilized, wherein a CU-CP entity (i.e., CU-control plane) hosts only the RRC related functions, and a CU-UP (CU-user plane) which is configured to host only PDCP/SDAP (user-plane) functions. The CU-CP and CU-UP entities can, in one variant, interface data and inter-process communications via an E1 data interface, although other approaches may be used.

In certain embodiments, each DU 506 is located within and/or services one or more areas within one or more venues or residences (e.g., a building, room, or plaza for commercial, corporate, academic purposes, and/or any other space suitable for wireless access). Each DU is configured to provide wireless network coverage within its coverage or connectivity range for its RAT (e.g., 5G NR). For example, a venue may have a wireless NR modem (DU) installed within the entrance thereof for prospective customers to connect to, including those in the parking lot via inter alia, their NR or LTE-enabled vehicles or personal devices of operators thereof. Notably, different classes of DU 506 may be utilized. In practical terms, some devices may have a working range on the order of hundreds of feet, while other devices may operate out to thousands of feet or more, the propagation and working range dictated by a number of factors, including the presence of RF or other interferers, physical topology of the venue/area, energy detection or sensitivity of the receiver, etc. Similarly, different types of NR-enabled DU 506 can be used depending on these factors, whether alone or with other wireless PHYs such as LTE, WLAN, etc.

It will also be appreciated that while described primarily with respect to a unitary gNB-CU entity or device 504 as shown in FIG. 5, the present disclosure is in no way limited to such architectures. For example, the techniques described herein may be implemented as part of a distributed or dis-aggregated or distributed CU entity (e.g., one wherein the user plane and control plane functions of the CU are dis-aggregated or distributed across two or more entities such as a CU-C (control) and CU-U (user)), and/or other functional divisions are employed.

Figure 5B:
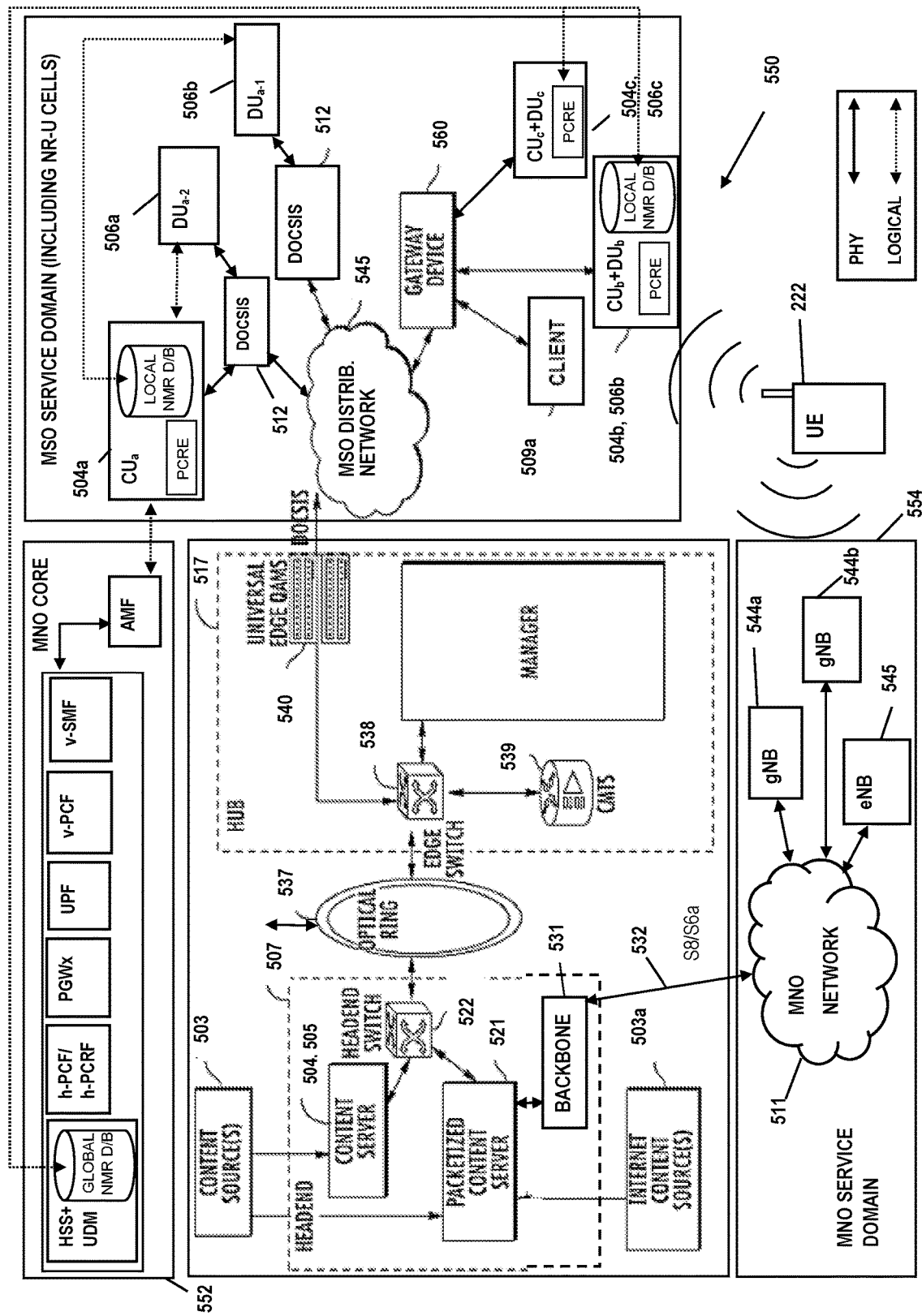
FIG. 5b is a functional block diagram of a second exemplary MSO/MNO network architecture useful in conjunction with various features described herein, wherein the MNO maintains the majority of 5G NR core infrastructure.

For instance, the individual DU's 506 in FIGS. 5a and 5b communicate data and messaging with the CU 504 via interposed physical communication interfaces and logical interfaces which may include a user plane and control plane, and be embodied in prescribed protocols such as F1AP. In one embodiment, one CU 504 is associated with one or more DU's 506, yet a given DU is only associated with a single CU. Likewise, the single CU 504 can be communicative with a single NG Core such as that operated by an MNO or MSO. Each NG Core may have multiple gNBs associated therewith.

Two or more gNBs may also be communicative with one another via e.g., an Xn interface, and accordingly can conduct at least CU to CU data transfer and communication. Separate NG Cores may be used for control and user plane (and other) functions of the network. Alternatively, the separate NG Cores may be logically "cross-connected" to the gNBs of one or more other NG Cores, such that one core can utilize/control the infrastructure of another, and vice versa. This may be in "daisy chain" fashion (i.e., one gNB is communicative one other NG Core other than its own, and that NG Core is communicate with yet one additional gNB other than its own, and so forth), or the gNBs and NG Cores may form a "mesh" topology where multiple Cores are in communication with multiple gNBs or multiple different entities (e.g., service providers). Yet other topologies will be recognized by those of ordinary skill given the present disclosure. This cross-connection approach advantageously allows for, inter alia, sharing of infrastructure between two MNOs/MSOs, which is especially useful in e.g., dense deployment environments which may not be able to support multiple sets of RAN infrastructure.

It is also noted that heterogeneous architectures of eNBs, Home eNBs or femtocells (i.e., E-UTRAN LTE/LTE-A Node B's or base stations) and gNBs may be utilized consistent with the architectures of FIGS. 4-5a. For instance, a given DU may act (i) solely as a DU (i.e., 5G NR-U PHY node) and operate outside of an E-UTRAN macrocell, or (ii) be physically co-located with an eNB or femtocell and provide NR coverage within a portion of the eNB macrocell coverage area, or (iii) be physically non-colocated with the eNB or femtocell, but still provide NR coverage within the macrocell coverage area.

Moreover, the DU/CU architectures set forth in co-owned U.S. patent application Ser. No. 15/945,657 filed Apr. 4, 2018 and entitled "APPARATUS AND METHODS FOR CELL ACTIVATION IN WIRELESS NETWORKS," and issued on Aug. 2, 2022 as U.S. Pat. No. 11,405,797, incorporated herein by reference in its entirety, may be used consistent with the various aspects of the present disclosure.

FIG. 5b is a functional block diagram of a second exemplary MSO/MNO network architecture 550, wherein the MNO maintains the majority of 5G NR core infrastructure, such as within the MNO core portion 552, which contains the 5G NR core components outside of the NG-RAN(s), the latter within the MSO service domain 554.

HSS+UDM Apparatus

Figure 6:
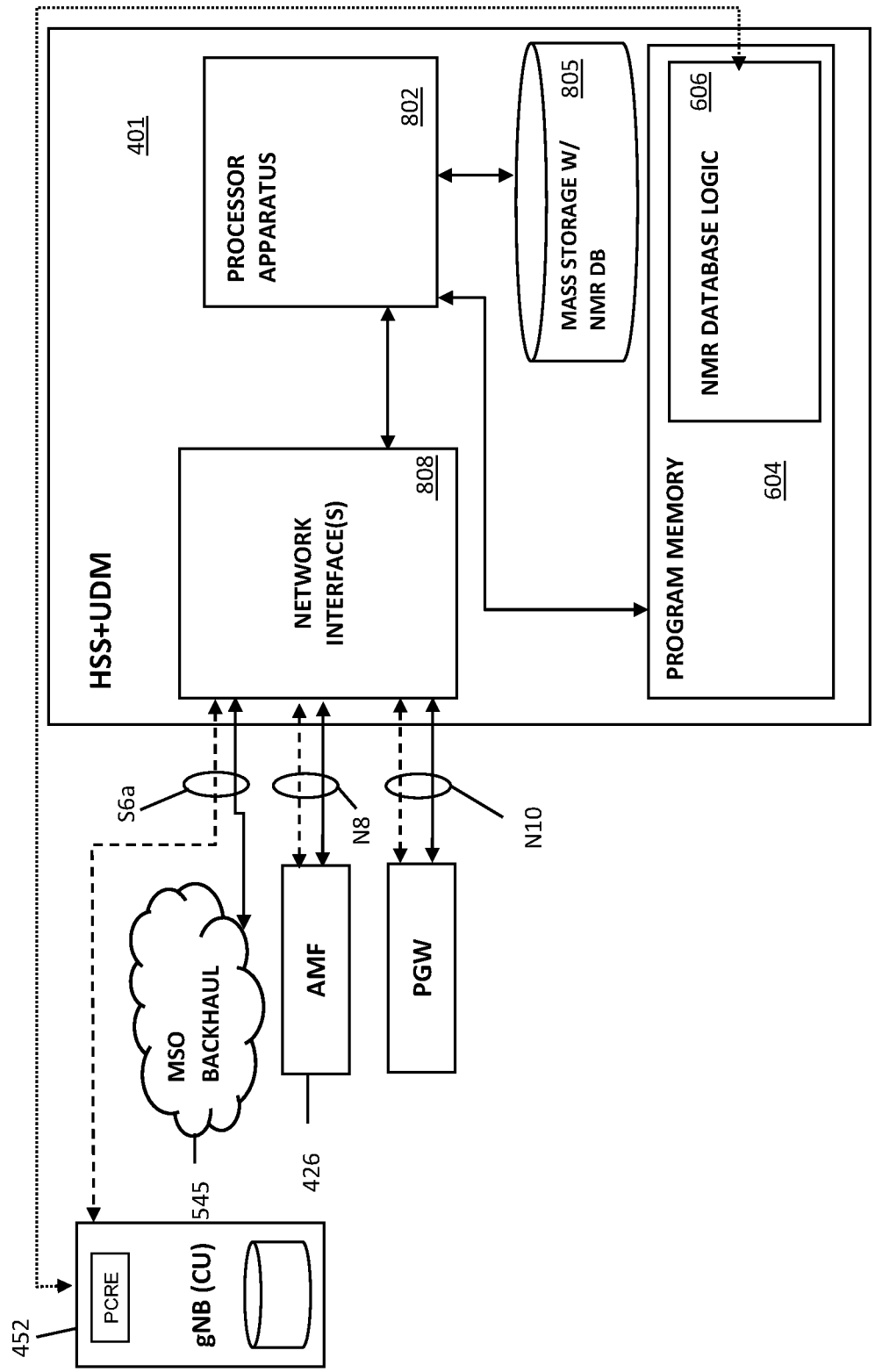
FIG. 6 is a functional block diagram illustrating a first exemplary embodiment of an HSS (Home Subscriber Service) and UDM (Unified Data Management), or HSS+UDM apparatus with PCI conflict resolution support, useful with various embodiments of the present disclosure.

FIG. 6 illustrates an exemplary configuration of an enhanced HSS+UDM 430 according to the present disclosure. As shown, the HSS+UDM 401 includes, inter alia, a processor apparatus or subsystem 602, a program memory module 604, mass storage 605 incorporating the parameter (e.g., NMR) database 402 for served UE, HSS (Home Subscriber Server) and UDM (Unified Data Management) logic 606 including management of the foregoing database 402, one or more network interfaces 608.

In the exemplary embodiment, the processor 602 of the HSS+UDM 401 may include one or more of a digital signal processor, microprocessor, field-programmable gate array, or plurality of processing components mounted on one or more substrates. The processor 602 may also comprise an internal cache memory, and is in communication with a memory subsystem 604, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 602.

The processing apparatus 602 is configured to execute at least one computer program stored in memory 604 (e.g., a non-transitory computer readable storage medium); in the illustrated embodiment, such programs include HSS+UDM-based NMR DB controller logic 606, such as to serve data from requesting AMF or other entities relating to individual UE or subscriber accounts relating to characterizing data such as NMR data (see discussion of FIGS. 3-3c above), and other logical functions performed by the HSS+UDM as described elsewhere herein. Other embodiments may implement such functionality within dedicated hardware, logic, and/or specialized co-processors (not shown). The HSS+ UDM DB controller logic 606 is a firmware or software module that, inter alia, communicates with a corresponding AMF (i.e., for setup for a given UE requesting access via a served NG-RAN with NR-U capability), and/or other upstream or backend entities such as those within the NG Core in some embodiments.

In some embodiments, the HSS+UDM logic 606 utilizes memory 604 or other storage 605 configured to temporarily hold a number of data relating to the various UE's (including UDM registration data, NMR data, etc.) for the various functions described herein including UE authentication and registration, PCI conflict resolution, etc.).

The HSS+UDM 401 may further be configured to directly or indirectly communicate with one or more authentication, authorization, and accounting (AAA) servers of the network, such as via the interface 608 shown in FIG. 6 and the MSO backhaul (e.g., where the HSS+UDM is disposed within the MSO infrastructure). The AAA servers, whether locally maintained by the MSO or remotely by e.g., an MNO of the subscriber, are configured to provide services for, e.g., authorization and/or control of network subscribers (including roaming MNO "visitors" to the MSO RAN(s), and/or roaming MSO subscribers visiting an SPLMN of an MNO) for controlling access and enforcing policies, auditing usage, and providing the information necessary to bill for services. As such, the AAA servers themselves may be used to supply NMR data or other similar context-related data necessary to support PCI conflict resolution according to the present disclosure.

In one exemplary embodiment, the HSS+UDM 401 is maintained by the MSO (see FIG. 5a) and is configured to utilize a non-public IP address within an IMS/Private Management Network "DMZ" of the MSO network. As a brief aside, so-called DMZs (demilitarized zones) within a network are physical or logical sub-networks that separate an internal LAN, WAN, PAN, or other such network from other untrusted networks, usually the Internet. External-facing servers, resources and services are disposed within the DMZ so they are accessible from the Internet, but the rest of the internal MSO infrastructure remains unreachable or partitioned. This provides an additional layer of security to the internal infrastructure, as it restricts the ability of surreptitious entities or processes to directly access internal MSO servers and data via the untrusted network, such as via a MME or AMF "spoof" or MITM attack whereby an attacker might attempt to hijack one or more functional entities to obtain data from the corresponding HSS+UDM.

gNB Apparatus

Figure 7:
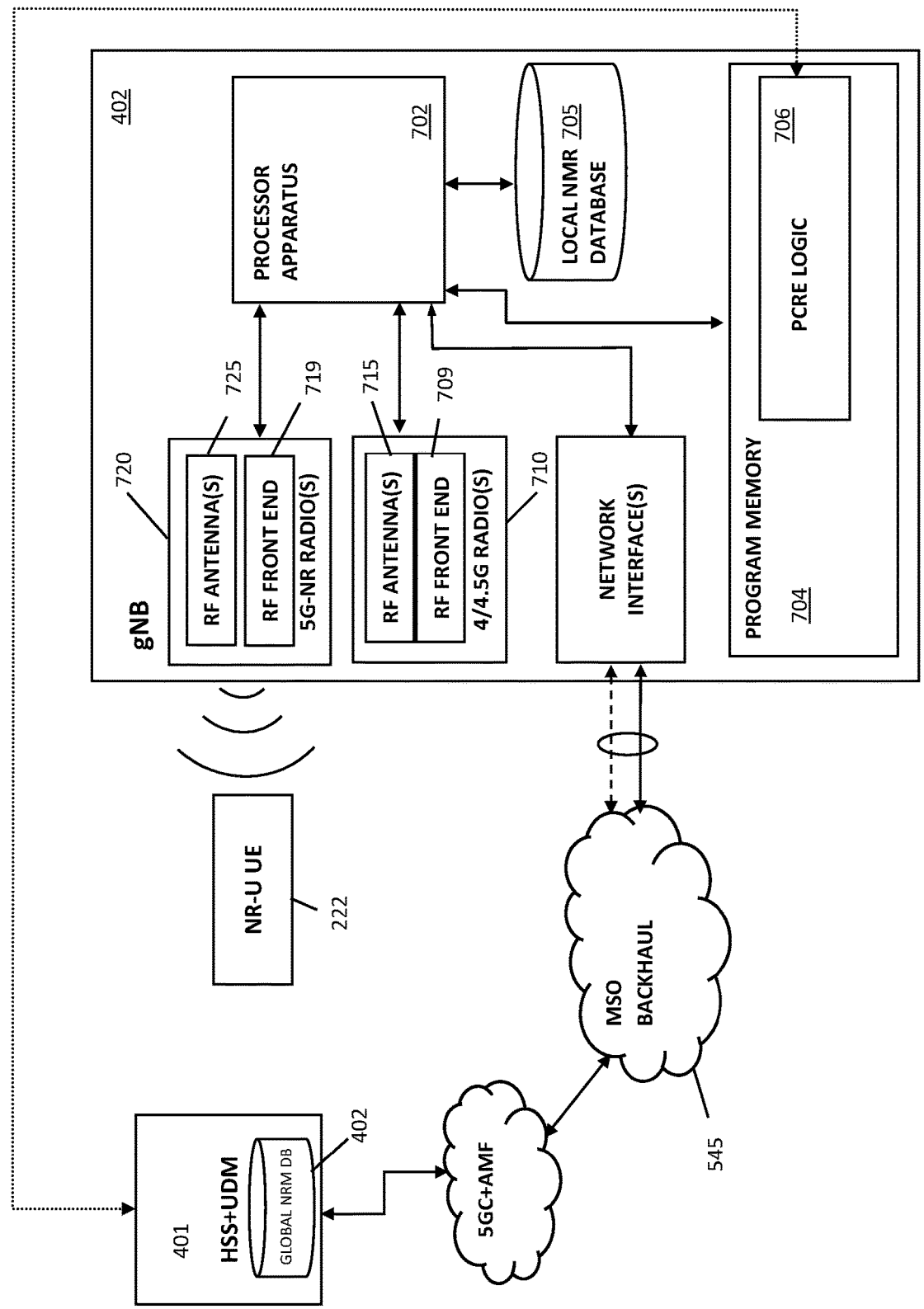
FIG. 7 is a functional block diagram illustrating a first exemplary embodiment of an enhanced 3GPP-compliant 5G NR gNB apparatus with PCI conflict resolution capability, useful with various embodiments of the present disclosure.

FIG. 7 illustrates a block diagram of an exemplary embodiment of a NR-U enabled gNB apparatus, useful for operation in accordance with the present disclosure.

In one exemplary embodiment as shown, the gNB (which may for instance take any of the forms shown in FIGS. 5a and 5b, including integrated CU 504 and DU 506, distributed CU/DU, etc.) includes, inter alia, a processor apparatus or subsystem 702, a program memory module 704, PCRE logic 706 (here implemented as software or firmware operative to execute on the processor 702), and wireless interfaces 710, 720 for communications with the relevant UE's (e.g., 4G/4.5G E-UTRAN and 5G-NR RAN, respectively).

The 5G RF interface 720 may be configured to comply with the relevant PHY and CU DU functional "splits" (e.g., Options 1 through 8) according to the relevant 3GPP NR standards which it supports. Returning again to FIG. 7, the antenna(s) 715, 725 of the radios of the gNB(s) may include multiple spatially diverse individual elements in e.g., a MIMO- or MISO-type configuration, such that spatial diversity of the received signals can be utilized. Moreover, a phased array or similar arrangement can be used for spatial resolution within the environment, such as based on time delays associated with signals received by respective elements.

In one embodiment, the processor apparatus 702 may include one or more of a digital signal processor, microprocessor, field-programmable gate array, or plurality of processing components mounted on one or more substrates. The processor apparatus 702 may also comprise an internal cache memory. The processing subsystem is in communication with a program memory module or subsystem 704, where the latter may include memory which may comprise, e.g., SRAM, flash and/or SDRAM components. The memory module 704 may implement one or more of direct memory access (DMA) type hardware, so as to facilitate data accesses as is well known in the art. The memory module of the exemplary embodiment contains one or more computer-executable instructions that are executable by the processor apparatus 702. A mass storage device (e.g., HDD or SSD, or NAND/NOR flash or the like) is also provided as shown.

The processor apparatus 702 is configured to execute at least one computer program stored in memory 704 (e.g., the logic of the PCRE including enhanced functions of PCI conflict resolution and operation according to the methods of FIGS. 3-3c herein, in the form of software or firmware that implements the various functions). Other embodiments may implement such functionality within dedicated hardware, logic, and/or specialized co-processors (not shown).

In some embodiments, the PCRE logic 706 also utilizes memory 704 or other storage 705 configured to temporarily and/or locally hold a number of data relating to the various NMR data and associations for the various UE which it services under the NR-U standard(s). In other embodiments, application program interfaces (APIs) may also reside in the internal cache or other memory 704. Such APIs may include common network protocols or programming languages configured to enable communication between the PCRE and other network entities (e.g., via API "calls" to or from the HSS+UDM 401 or AMF 426).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

APPENDIX I

MODIFIED NR ASN.1 (TS 38.331)
© Copyright 2018-2019 Charter Communications Operating, LLC.

```
MeasObjectNR information element
-- ASN1START
-- TAG-MEAS-OBJECT-NR-START
MeasObjectNR ::=                          SEQUENCE {
    ssbFrequency                              ARFCN-ValueNR                                                           OPTIONAL,    -- Cond
SSBorAssociatedSSB
    ssbSubcarrierSpacing                      SubcarrierSpacing                                                       OPTIONAL,    -- Cond
SSBorAssociatedSSB
    smtc1                                     SSB-MTC                                                                 OPTIONAL,    -- Cond
SSBorAssociatedSSB
    smtc2                                     SSB-MTC2                                                                OPTIONAL,    -- Cond
IntraFreqConnected
    refFreqCSI-RS                             ARFCN-ValueNR                                                           OPTIONAL,
    referenceSignalConfig                     ReferenceSignalConfig,
    absThreshSS-BlocksConsolidation           ThresholdNR                                                             OPTIONAL,    -- Need R
    absThreshCSI-RS-Consolidation             ThresholdNR                                                             OPTIONAL,    -- Need R
    nrofSS-BlocksToAverage                    INTEGER (2..maxNrofSS-BlocksToAverage)                                  OPTIONAL,    -- Need R
    nrofCSI-RS-ResourcesToAverage             INTEGER (2..maxNrofCSI-RS-ResourcesToAverage)                           OPTIONAL,    -- Need R
    quantityConfigIndex                       INTEGER (1..maxNrofQuantityConfig),
    offsetMO                                  Q-OffsetRangeList,
measReportLBTScanTime                         INTEGER (XX..maxMeasRepPCIScanTime)
maxMeasRepPCIScanTime                         INTEGER ::= YY
    cellsToRemoveList                         PCI-List                                                                OPTIONAL,    -- Need N
    cellsToAddModList                         CellsToAddModList                                                       OPTIONAL,    -- Need N
    blackCellsToRemoveList                    PCI-RangeIndexList                                                      OPTIONAL,    -- Need N
    blackCellsToAddModList                    SEQUENCE (SIZE (1..maxNrofPCI-Ranges)) OF PCI-RangeElement              OPTIONAL,    -- Need N
    whiteCellsToRemoveList                    PCI-RangeIndexList                                                      OPTIONAL,    -- Need N
    whiteCellsToAddModList                    SEQUENCE (SIZE (1..maxNrofPCI-Ranges)) OF PCI-RangeElement              OPTIONAL,    -- Need N ... ,
    [ [
    freqBandIndicatorNR-v1530                 FreqBandIndicatorNR                                                     OPTIONAL,    -- Need R
    measCycleSCell-v1530                      ENUMERATED {sf160, sf256, sf320, sf512,sf640, sf1024, sf1280}           OPTIONAL     -- Need R
    ] ]
}
ReferenceSignalConfig::=                  SEQUENCE {
    ssb-ConfigMobility                        SSB-ConfigMobility                                                      OPTIONAL,    -- Need M
    csi-rs-ResourceConfigMobility             SetupRelease {CSI-RS-ResourceConfigMobility }                           OPTIONAL     -- Need M
}
SSB-ConfigMobility::=                     SEQUENCE {
    ssb-ToMeasure                             SetupRelease {SSB-ToMeasure }                                           OPTIONAL,    -- Need M
    deriveSSB-IndexFromCell                   BOOLEAN,
    ss-RSSI-Measurement                       SS-RSSI-Measurement                                                     OPTIONAL,    -- Need M
    ...
}
Q-OffsetRangeList ::=                     SEQUENCE {
    rsrpOffsetSSB                             Q-OffsetRange           DEFAULT dB0,
    rsrqOffsetSSB                             Q-OffsetRange           DEFAULT dB0,
    sinrOffsetSSB                             Q-OffsetRange           DEFAULT dB0,
    rsrpOffsetCSI-RS                          Q-OffsetRange           DEFAULT dB0,
    rsrqOffsetCSI-RS                          Q-OffsetRange           DEFAULT dB0,
    sinrOffsetCSI-RS                          Q-OffsetRange           DEFAULT dB0
}
ThresholdNR ::=                           SEQUENCE{
    thresholdRSRP                             RSRP-Range                                                              OPTIONAL,    -- Need R
    thresholdRSRQ                             RSRQ-Range                                                              OPTIONAL,    -- Need R
    thresholdSINR                             SINR-Range                                                              OPTIONAL     -- Need R
}
CellsToAddModList ::=                     SEQUENCE (SIZE (1..maxNrofCellMeas)) OF CellsToAddMod
CellsToAddMod ::=                         SEQUENCE {
    physCellId                                PhysCellId,
    cellIndividualOffset                      Q-OffsetRangeList
}
    -- TAG-MEAS-OBJECT-NR-STOP
    -- ASN1STOP
```

APPENDIX II

MODIFIED 5G UE-NR CAPABILITY IE (TS 38.306)

©Copyright 2018-2019 Charter Communications Operating, LLC.

```
UE-NR-Capability information element
-- ASN1START
-- TAG-UE-NR-CAPABILITY-START
UE-NR-Capability ::=                SEQUENCE {
    accessStratumRelease                AccessStratumRelease,
    pdcp-Parameters                     PDCP-Parameters,
    rlc-Parameters                      RLC-Parameters               OPTIONAL,
    mac-Parameters                      MAC-Parameters               OPTIONAL,
    phy-Parameters                      Phy-Parameters,
    rf-Parameters                       RF-Parameters,
    measAndMobParameters                MeasAndMobParameters         OPTIONAL,
    fdd-Add-UE-NR-Capabilities          UE-NR-CapabilityAddXDD-Mode  OPTIONAL,
    tdd-Add-UE-NR-Capabilities          UE-NR-CapabilityAddXDD-Mode  OPTIONAL,
    fr1-Add-UE-NR-Capabilities          UE-NR-CapabilityAddFRX-Mode  OPTIONAL,
    fr2-Add-UE-NR-Capabilities          UE-NR-CapabilityAddFRX-Mode  OPTIONAL,
    featureSets                         FeatureSets                  OPTIONAL,
    featureSetCombinations              SEQUENCE (SIZE (1..maxFeatureSetCombinations)) OF FeatureSetCombination   OPTIONAL,
    lateNonCriticalExtension            OCTET STRING                 OPTIONAL,
    nonCriticalExtension                UE-NR-Capability-1530        OPTIONAL
}
UE-NR-Capability-1530 ::=           SEQUENCE {
    fdd-Add-UE-NR-Capabilities-1530     UE-NR-CapabilityAddXDD-Mode-1530   OPTIONAL,
    tdd-Add-UE-NR-Capabilities-1530     UE-NR-CapabilityAddXDD-Mode-1530   OPTIONAL,
    voiceOverMCG-Bearer                 ENUMERATED {supported}             OPTIONAL,
    interRAT-Parameters                 InterRAT-Parameters                OPTIONAL,
    inactiveState                       ENUMERATED{supported}              OPTIONAL,
delayBudgetReporting                    ENUMERATED{supported}              OPTIONAL,
noMobiiltyRequired                          ENUMERATED(supported,not supported    OPTIONAL,
    nonCriticalExtension                SEQUENCE { }                       OPTIONAL
}
UE-NR-CapabilityAddXDD-Mode ::=     SEQUENCE {
    phy-ParametersXDD-Diff              Phy-ParametersXDD-Diff       OPTIONAL,
    mac-ParametersXDD-Diff              MAC-ParametersXDD-Diff       OPTIONAL,
    measAndMobParametersXDD-Diff        MeasAndMobParametersXDD-Diff OPTIONAL
}
UE-NR-CapabilityAddXDD-Mode-1530 ::=    SEQUENCE {
    eutra-ParametersXDD-Diff                EUTRA-ParametersXDD-Diff
}
UE-NR-CapabilityAddFRX-Mode ::=     SEQUENCE {
    phy-ParametersFRX-Diff              Phy-ParametersFRX-Diff       OPTIONAL,
    measAndMobParametersFRX-Diff        MeasAndMobParametersFRX-Diff OPTIONAL
}
-- TAG-UE-NR-CAPABILITY-STOP
-- ASN1STOP
```

APPENDIX III

MODIFIED NR INCLUDING PLMN NUMBER LIMIT - ASN.1 (TS 38.331)

© Copyright 2018-2019 Charter Communications Operating, LLC.

```
MeasObjectNR information element
-- ASN1START
-- TAG-MEAS-OBJECT-NR-START
MeasObjectNR ::=                    SEQUENCE {
    ssbFrequency                        ARFCN-ValueNR                OPTIONAL,   -- Cond
SSBorAssociatedSSB
    ssbSubcarrierSpacing                SubcarrierSpacing            OPTIONAL,   -- Cond
SSBorAssociatedSSB
    smtc1                               SSB-MTC                      OPTIONAL,   -- Cond
SSBorAssociatedSSB
    smtc2                               SSB-MTC2                     OPTIONAL,   -- Cond
IntraFreqConnected
    refFreqCSI-RS                       ARFCN-ValueNR                              OPTIONAL,
    referenceSignalConfig               ReferenceSignalConfig,
    absThreshSS-BlocksConsolidation     ThresholdNR                                OPTIONAL,  -- Need R
    absThreshCSI-RS-Consolidation       ThresholdNR                                OPTIONAL,  -- Need R
    nrofSS-BlocksToAverage              INTEGER (2..maxNrofSS-BlocksToAverage)     OPTIONAL,  -- Need R
    nrofCSI-RS-ResourcesToAverage       INTEGER (2..maxNrofCSI-RS-ResourcesToAverage)  OPTIONAL,  -- Need R
    quantityConfigIndex                 INTEGER (1..maxNrofQuantityConfig),
    offsetMO                            Q-OffsetRangeList,
measReportLBTScanTime                   INTEGER (XX..maxMeasRepPCIScanTime)
maxMeasRepPCIScanTime                   INTEGER ::= YY
```

APPENDIX III-continued

MODIFIED NR INCLUDING PLMN NUMBER LIMIT - ASN.1 (TS 38.331)

© Copyright 2018-2019 Charter Communications Operating, LLC.

```
    maxPLMNsPerPCIToReport              INTEGER ::= (1..maxNrOfPLMNsPerPCIToReport)             OPTIONAL --
    maxNrOfPLMNsPerPCIToReport          INTEGER ::= 20
        cellsToRemoveList               PCI-List                                                OPTIONAL,   -- Need N
        cellsToAddModList               CellsToAddModList                                       OPTIONAL,   -- Need N
        blackCellsToRemoveList          PCI-RangeIndexList                                      OPTIONAL,   -- Need N
        blackCellsToAddModList          SEQUENCE (SIZE (1..maxNrofPCI-Ranges)) OF PCI-RangeElement     OPTIONAL,   -- Need N
        whiteCellsToRemoveList          PCI-RangeIndexList                                      OPTIONAL,   -- Need N
        whiteCellsToAddModList          SEQUENCE (SIZE (1..maxNrofPCI-Ranges)) OF PCI-RangeElement     OPTIONAL,   -- Need N
        ...,
        [[
        freqBandIndicatorNR-v1530       FreqBandIndicatorNR                                     OPTIONAL,   -- Need R
        measCycleSCell-v1530            ENUMERATED {sf160, sf256, sf320, sf512,sf640, sf1024, sf1280}   OPTIONAL   -- Need R
        ]]
    }
    ReferenceSignalConfig::=            SEQUENCE {
        ssb-ConfigMobility              SSB-ConfigMobility                                      OPTIONAL,   -- Need M
        csi-rs-ResourceConfigMobility   SetupRelease { CSI-RS-ResourceConfigMobility }          OPTIONAL    -- Need M
    }
    SSB-ConfigMobility::=               SEQUENCE {
        ssb-ToMeasure                   SetupRelease {SSB-ToMeasure }                           OPTIONAL,   -- Need M
        deriveSSB-IndexFromCell         BOOLEAN,
        ss-RSSI-Measurement             SS-RSSI-Measurement                                     OPTIONAL,   -- Need M
        ...
    }
    Q-OffsetRangeLEst ::=               SEQUENCE {
        rsrpOffsetSSB                   Q-OffsetRange       DEFAULT dB0,
        rsrqOffsetSSB                   Q-OffsetRange       DEFAULT dB0,
        sinrOffsetSSB                   Q-OffsetRange       DEFAULT dB0,
        rsrpOffsetCSI-RS                Q-OffsetRange       DEFAULT db0,
        rsrgOffsetCSI-RS                Q-OffsetRange       DEFAULT dB0,
        sinrOffsetCSI-RS                Q-OffsetRange       DEFAULT dB0
    }
    ThresholdNR ::=                     SEQUENCE{
        thresholdRSRP                   RSRP-Range          OPTIONAL,   -- Need R
        thresholdRSRQ                   RSRQ-Range          OPTIONAL,   -- Need R
        thresholdSINR                   SINR-Range          OPTIONAL    -- Need R
    }
    CellsToAddModList ::=               SEQUENCE (SIZE (1..maxNrofCellMeas)) OF CellsToAddMod
    CellsToAddMod ::=                   SEQUENCE {
        physCellId                      PhysCellId,
        cellIndividualOffset            Q-OffsetRangeList
    }
        -- TAG-MEAS-OBJECT-NR-STOP
        -- ASN1STOP
    -- ASN1START
    -- TAG-PCI-RANGE-START
    PCI-Range ::=                       SEQUENCE {
        start                           PhysCellId,
        range                           ENUMERATED {n4, n8, n12, n16, n24, n32, n48, n64, n84, n96, n128, n168, n252, n504,
                                        n1008,spare1}             OPTIONAL -- Need S
        nrCellId                        CellGlobalIdNR            OPTIONAL -- PCIs of specific PLMNs for which
    Measurements Reports are to be disabled
    }
    CellGlobalIdNR ::=       SEQUENCE {
        plmn-Identity                   PLMN-Identity,
        cellIdentity                    CellIdentity
    }
    -- TAG-PCI-RANGE-STOP
    -- ASN1STOP
    -   MeasResults IE
    -- ASN1START
    -- TAG-MEAS-RESULTS-START
    MeasResults ::=                     SEQUENCE {
        measId                          MeasId,
        measResultServingMOList         MeasResultServMOList,
        measResultNeighCells            CHOICE {
            measResultListNR            MeasResultListNR,
            ...,
            measResultListEUTRA         MeasResultListEUTRA
        }                                                                                       OPTIONAL,
        ...
    }
    MeasResultServMOList ::=            SEQUENCE (SIZE (1..maxNrofServEngCells)) OF MeasResultServMO
    MeasResultServMO ::=                SEQUENCE {
        servCellId                      ServCellIndex,
        measResultServingCell           MeasResultNR,
```

APPENDIX III-continued

MODIFIED NR INCLUDING PLMN NUMBER LIMIT - ASN.1 (TS 38.331)

© Copyright 2018-2019 Charter Communications Operating, LLC.

```
    measResultBestNeighCell       MeasResultNR                                                              OPTIONAL,
    ...
}
MeasResultListNR ::=              SEQUENCE (SIZE (1..maxCellReport)) OF MeasResultNR
MeasResultNR ::=                  SEQUENCE {
    physCellId                        PhysCellId                                                            OPTIONAL,
    plmn-Identity                     PLN-Identity                                                          OPTIONAL
    measResult                        SEQUENCE {
        cellResults                       SEQUENCE{
            resultsSSB-Cell                   MeasQuantityResults                                           OPTIONAL,
            resultsCSI-RS-Cell                MeasQuantityResults                                           OPTIONAL
        },
        rsIndexResults                    SEQUENCE{
            resultsSSB-Indexes                ResultsPerSSB-IndexList                                       OPTIONAL,
            resultsCSI-RS-Indexes             ResultsPerCSI-RS-IndexList                                    OPTIONAL
        }                                                                                                   OPTIONAL
    },
    ...,
    [ [
    cgi-Info                          CGI-Info                                                              OPTIONAL
    ] ]
}
MeasResultListEUTRA ::=           SEQUENCE (SIZE (1..maxCellReport)) OF MeasResultEUTRA
MeasResultEUTRA ::=               SEQUENCE {
    physCellId                        PhysCellId,
    measResult                        MeasQuantityResultsEUTRA,
    cgi-Info                          SEQUENCE {
        cgi-info-EPC                      SEQUENCE {
            cgi-info-EPC-legacy               CellAccessRelatedInfo-EUTRA-EPC,
            cgi-info-EPC-list                 SEQUENCE (SIZE (1..maxPLMN)) OF CellAccessRelatedInfo-EUTRA-EPC    OPTIONAL
        } OPTIONAL,
        cgi-info-5GC                      SEQUENCE (SIZE (1..maxPLMN)) OF CellAccessRelatedInfo-EUTRA-5GC   OPTIONAL,
        freqBandIndicator                 FreqBandIndicatorEUTRA,
        multiBandInfoList                 MultiBandInfoListEUTRA                                            OPTIONAL,
        freqBandIndicatorPriority         ENUMERATED {true}                                                 OPTIONAL
    }                                                                                                       OPTIONAL,
    ...
}
MultiBandInfoListEUTRA ::=        SEQUENCE (SIZE (1..maxMultiBands)) OF FreqBandIndicatorEUTRA
MeasQuantityResults ::=           SEQUENCE {
    rsrp                              RSRP-Range                                                            OPTIONAL,
    rsrq                              RSRQ-Range                                                            OPTIONAL,
    sinr                              SINR-Range                                                            OPTIONAL
}
MeasQuantityResultsEUTRA ::=      SEQUENCE {
    rsrp                              RSRP-RangeEUTRA                                                       OPTIONAL,
    rsrq                              RSRQ-RangeEUTRA                                                       OPTIONAL,
    sinr                              SINR-RangeEUTRA                                                       OPTIONAL
}
ResultsPerSSB-IndexList::=         SEQUENCE (SIZE (1..maxNrofIndexesToReport2)) OF ResultsPerSSB-Index
ResultsPerSSB-Index ::=            SEQUENCE {
    ssb-Index                         SSB-Index,
    ssb-Results                       MeasQuantityResults                                                   OPTIONAL
}
ResultsPerCSI-RS-IndexList::=      SEQUENCE (SIZE (1..maxNrofIndexesToReport2)) OF ResultsPerCSI-RS-Index
ResultsPerCSI-RS-Index ::=         SEQUENCE {
    csi-RS-Index                      CSI-RS-Index,
    csi-RS-Results                    MeasQuantityResults                                                   OPTIONAL
}
-- TAG-MEAS-RESULTS-STOP
-- ASN1STOP
```

APPENDIX IV

MODIFIED NR - ALTERNATE EMBODIMENT- ASN.1 (TS 38.331)

© Copyright 2018-2019 Charter Communications Operating, LLC.

```
MeasObjNR IE
-- ASN1START
-- TAG-MEASOBJECTNR-START
MeasObjectNR ::=                    SEQUENCE {
    ssbFrequency                        ARFCN-ValueNR                                           OPTIONAL,   -- Cond SSBorAssocEatedSSB
    ssbSubcarrEerSpacing                SubcarrierSpacEng                                       OPTIONAL,   -- Cond SSBorAssocEatedSSB
    smtc1                               SSB-MTC                                                 OPTIONAL,   -- Cond SSBorAssocEatedSSB
    smtc2                               SSB-MTC2                                                OPTIONAL,   -- Cond IntraFreqConnected
    refFreqCSI-RS                       ARFCN-ValueNR                                           OPTIONAL,   -- Cond CSI-RS
    referenceSignalConfig               ReferenceSignalConfig,
    absThreshSS-BlocksConsolidation     ThresholdNR                                             OPTIONAL,   -- Need R
    absThreshCSI-RS-Consolidation       ThresholdNR                                             OPTIONAL,   -- Need R
    nrofSS-BlocksToAverage              INTEGER (2..maxNrofSS-BlocksToAverage)                  OPTIONAL,   -- Need R
    nrofCSI-RS-ResourcesToAverage       INTEGER (2..maxNrofCSI-RS-ResourcesToAverage)           OPTIONAL,   -- Need R
    quantityConfigIndex                 INTEGER (1..maxNrofQuantityConfig),
    offsetMO                            Q-OffsetRangeList,
    cellsToRemoveList                   PCI-List                                                OPTIONAL,   -- Need N
    cellsToAddModList                   CellsToAddModList                                       OPTIONAL,   -- Need N
    blackCellsToRemoveList              PCI-RangeIndexList                                      OPTIONAL,   -- Need N
    blackCellsToAddModList              SEQUENCE (SIZE (1..maxNrofPCI-Ranges)) OF PCI-RangeElement OPTIONAL, -- Need N
    whiteCellsToRemoveList              PCI-RangeIndexList                                      OPTIONAL,   -- Need N
    whiteCellsToAddModList              SEQUENCE (SIZE (1..maxNrofPCI-Ranges)) OF PCI-RangeElement OPTIONAL, -- Need N
    ... ,
    [[
    freqBandIndEcatorNR-v1530           FreqBandIndEcatorNR                                     OPTIONAL,   -- Need R
    measCycleSCell-v1530                ENUMERATED {sf160, sf256, sf320, sf512, sf640, sf1024, sf1280}  OPTIONAL -- Need R
    ]]
    [[
    measReportLBTScanTime               INTEGER (XX..maxMeasRepPCIScanTime)                     OPTIONAL,
    maxMeasRepPCIScanTime               INTEGER ::= YY                                          OPTIONAL,
    maxPLMNsPerPCIToReport              INTEGER ::= (1..maxNrOfPLMNsPerPCIToReport)             OPTIONAL,
    maxNrOfPLMNsPerPCIToReport          INTEGER ::= 20                                          OPTIONAL,
    blackCellsToAddModList              BlockPCIOfCertainPLMNs                                  OPTIONAL,
    blackCellsToRemoveList              BlockPCIOfCertainPLMNs                                  OPTIONAL
    ]]
}
ReferenceSignalConfig::=            SEQUENCE {
    ssb-ConfigMobility                  SSB-ConfigMobility                                      OPTIONAL,   -- Need M
    csi-rs-ResourceConfigMobility       SetupRelease { CSI-RS-ResourceConfigMobility }          OPTIONAL    -- Need M
}
SSB-ConfEgMobility::=               SEQUENCE {
    ssb-ToMeasure                       SetupRelease { SSB-ToMeasure }                          OPTIONAL,   -- Need M
    deriveSSB-IndexFromCell             BOOLEAN,
    ss-RSSI-Measurement                 SS-RSSI-Measurement                                     OPTIONAL,   -- Need M
    ...
}
Q-OffsetRangeList ::=               SEQUENCE {
    rsrpOffsetSSB                       Q-OffsetRange           DEFAULT dB0,
    rsrgOffsetSSB                       Q-OffsetRange           DEFAULT dB0,
    sEnrOffsetSSB                       Q-OffsetRange           DEFAULT dB0,
    rsrpOffsetCSI-RS                    Q-OffsetRange           DEFAULT dB0,
    rsrqOffsetCSI-RS                    Q-OffsetRange           DEFAULT dB0,
    sinrOffsetCSI-RS                    Q-OffsetRange           DEFAULT dB0
}
ThresholdNR ::=                     SEQUENCE {
    thresholdRSRP                       RSRP-Range                                              OPTIONAL,   -- Need R
    thresholdRSRQ                       RSRQ-Range                                              OPTIONAL,   -- Need R
    thresholdSINR                       SINR-Range                                              OPTIONAL    -- Need R
}
CellsToAddModList ::=               SEQUENCE (SIZE (1..maxNrofCellMeas)) OF CellsToAddMod
CellsToAddMod ::=                   SEQUENCE {
    physCellId                          PhysCellId,
    cellIndividualOffset                Q-OffsetRangeList
}
BlockPCIOfCertainPLMNs::=           SEQUENCE }
    cellIdentity                        CellIdentity        OPTIONAL,
    plmn-Identity                       PLN-Identity        OPTIONAL
}
-- TAG-MEASOBJECTNR-STOP
-- ASN1STOP
```

What is claimed is:

1. Computerized wireless network apparatus, comprising:
   a digital processor apparatus;
   wireless network interface apparatus configured for data communication with the digital processor apparatus, at least one wireless-enabled data network, and a plurality of computerized wireless client devices; and
   at least one storage device in data communication with the digital processor apparatus, the at least one storage device comprising at least one computer program having a plurality of instructions configured to, when executed by the digital processor apparatus, cause the computerized wireless network apparatus to:
   identify at least one of the plurality of computerized wireless client devices for which a prescribed operational configuration is applicable, the identification based on at least one parameter indicating that no mobility is required for at least one of the plurality of computerized wireless client devices;
   based on the identification, apply a cell identifier resolution mechanism to only one or more others of the plurality of computerized wireless client devices and not the at least one of the plurality of computerized wireless client devices;
   cause instruction of the one or more others of the plurality of computerized wireless client devices to perform a measurement protocol pursuant to the cell identifier resolution mechanism; and
   based on one or more results of the performance of the measurement protocol, cause configuration of at least one data structure relating to cell identifiers.

2. The computerized wireless network apparatus of claim 1, wherein the plurality of instructions are further configured to, when executed by the digital processor apparatus, cause the computerized wireless network apparatus to:
   obtain one or more Public Land Mobile Network identification (PLMN ID) values via a PLMN-ID value within a measurement results reporting information element (IE).

3. The computerized wireless network apparatus of claim 1, wherein:
   the computerized wireless network apparatus comprises at least one of a 3rd Generation Partnership Project (3GPP)-compliant gNB (gNodeB) or a 3GPP-compliant AMF (access management function) apparatus;
   the plurality of computerized wireless client devices comprise a plurality of 3GPP-compliant user equipment (UEs); and
   the cell identifiers comprise PCI (Physical Cell identification) values.

4. The computerized wireless network apparatus of claim 1, wherein the identification of the at least one of the plurality of computerized wireless client devices for which the prescribed operational configuration is applicable comprises evaluation of a plurality of mobility-related parameters associated with at least a portion of the plurality of computerized wireless client devices the plurality of mobility-related parameters comprises the at least one mobility-related parameter.

5. The computerized wireless network apparatus of claim 1, wherein the causation of the instruction of the others of the plurality of computerized wireless client devices to perform the measurement protocol pursuant to the cell identifier resolution mechanism comprises causation of an instruction to only ones of the plurality of computerized wireless client devices not being used for a fixed wireless application to perform the measurement protocol only for certain selected one or more PCI (physical cell identification) values.

6. A method of cell identifier conflict resolution relating to unlicensed spectrum utilization within a wireless system having a plurality of wireless-enabled client devices associated therewith, the method comprising:
   specifying one or more mobility-related parameters associated with at least one wireless-enabled client device of the plurality of wireless-enabled client devices, the one or more mobility-related parameters comprising at least one of: (i) at least one no mobility required parameter, (ii) at least one limited mobility required parameter, or (iii) at least one full mobility required parameter;
   utilizing, via one or more apparatus of the wireless system, the one or more mobility-related parameters to determine whether the at least one wireless-enabled client device requires a mobility context; and
   determining, based at least on the determination of whether the at least one wireless-enabled client device requires the mobility context, that the at least one wireless-enabled client device should perform at least one RF (radio frequency) measurement protocol to enable reporting of data relating to performance of the at least one RF measurement protocol back to the one or more apparatus of the wireless system.

7. The method of claim 6, further comprising:
   causing the at least one wireless-enabled client device to perform the at least one RF measurement protocol and the reporting of the data; and
   identifying, based at least on the reported data, at least one conflict in PCI encountered during operation by the at least one wireless-enabled client device.

8. The method of claim 7, wherein:
   the at least one wireless-enabled client device comprises a 5G NR-U (Fifth Generation New Radio—Unlicensed) compliant UE (user equipment) operating within an NR-U unlicensed frequency band; and
   the performance of the at least one RF measurement protocol and the reporting of the data comply with 5G NR-U listen-before-talk (LBT) and data reporting protocols, respectively.

9. A computerized method for cell identification within a wireless network, the computerized method comprising:
   causing an access and mobility management function (AMF) apparatus to initiate an initial context setup procedure with respect to one or more computerized client devices;
   based at least on data received via use of the initial context setup procedure, identifying at least one of the one or more computerized client devices for PCI (physical cell identification) ambiguity resolution;
   instructing the at least one of the one or more computerized client devices to perform a measurement protocol; and
   based on data relating to the measurement protocol, applying computerized logic to determine whether to update at least one then-current data structure to perform at least one of an inclusion or exclusion of at least one PCI value.

10. The computerized method of claim 9, wherein the identifying of the at least one of the one or more computerized client devices for the PCI ambiguity resolution comprises identifying the at least one of the one or more computerized client devices further based at least on a mobility-related factor.

11. The computerized method of claim 10, where the identifying the at least one of the one or more computerized client devices for the PCI confusion resolution based at least on the mobility-related factor comprises identifying the at least one of the one or more computerized client devices as requiring application of an ambiguity resolution mechanism based at least on a prescribed parameter relating to at least one of: (i) intra-cell mobility or (ii) inter-cell mobility.

12. The computerized method of claim 9, wherein the causing of the AMF apparatus to initiate the initial context setup procedure is based on at least one of: (i) existence of a logical Next Generation (NG)-connection for the one or more computerized client devices, or (ii) receipt by the AMF apparatus of a radio access network (RAN) user equipment (UE) Next Generation Access Point (NGAP) identification (ID) information element (IE).

13. The computerized method of claim 9, wherein the instructing of the at least one of the one or more computerized client devices to perform the measurement protocol comprises instructing the at least one of the one or more computerized client devices to perform the measurement protocol using at least an LBT (Listen Before Talk) protocol.

14. The computerized method of claim 9, wherein the instructing of the at least one of the one or more computerized client devices to perform the measurement protocol comprises:
    determining one or more target PCI values;
    determining one or more duration values, the one or more duration values each specifying a duration for which the measurement protocol is to be performed;
    instructing the at least one of the one or more computerized client devices with the one or more target PCI values and the one or more duration values;
    receiving the data relating to the measurement protocol from the at least one of the one or more computerized client devices; and
    based at least on the data relating to the measurement protocol, extracting reporting data for the one or more target PCI values.

15. The computerized method of claim 14, wherein the extracting of the reporting data for the one or more target PCI values comprises extracting signal strength data for one or more prescribed frequencies.

16. The computerized method of claim 14, wherein instructing of the at least one of the one or more computerized client devices with the one or more target PCI values and the one or more duration values, respectively, comprises instructing the at least one of the one or more computerized client devices with a scan time, the scan time comprising a time which the at least one of the one or more computerized client devices is to scan for all possible SSBs (synchronization signal blocks) being broadcasted in a same PCI by different PLMNs (public land mobile networks).

17. A computerized method for cell identification within a wireless network, the computerized method comprising:
    receiving one or more respective context messages from a mobility management apparatus;
    analyzing the one or more respective context messages to determine one or more respective mobility statuses of a plurality of computerized client devices;
    utilizing the determined one or more respective mobility statuses to identify one or more computerized client devices of the plurality of computerized client devices for PCI (physical cell identification) ambiguity resolution;
    instructing the one or more computerized client devices to perform a measurement protocol; and
    based on data relating to the measurement protocol, applying computerized logic to determine whether to update at least one then-current data structure to perform at least one of an inclusion or exclusion of at least one PCI value.

18. The computerized method of claim 17, further comprising causing the mobility management apparatus to:
    (i) access subscription data to obtain mobility-related data associated with the one or more computerized client devices; and
    (ii) insert at least a portion of the mobility-related data into the one or more respective context messages.

19. A computerized method for cell identification within a wireless network, the computerized method comprising:
    identifying one or more computerized client devices for PCI (physical cell identification) ambiguity resolution;
    instructing the one or more computerized client devices to perform a measurement protocol; and
    based on data relating to the measurement protocol, applying computerized logic to determine whether to update at least one of a then-current data structure to perform at least one of an inclusion or exclusion of at least one PCI value, the applying of the computerized logic to determine whether to update the at least one then-current data structure to perform the at least one of the inclusion or the exclusion comprising:
        (i) extracting reporting data from the data relating to the measurement protocol for each target PCI value; and
        (ii) evaluating the extracted reporting data for each target PCI value to determine whether at least one conflict is present.

20. The computerized method of claim 19, further comprising, based on a determination that the at least one conflict is present, updating the at least one then-current data structure to perform the at least one of the inclusion or the exclusion, the updating configured to enable or disable one or more measurement reports from one or more respective PCIs of a PLMN (public land mobile network).

* * * * *